(12) United States Patent
Polus et al.

(10) Patent No.: US 11,365,300 B2
(45) Date of Patent: Jun. 21, 2022

(54) PARTICULATE PREPREG FORMING AID

(71) Applicant: The Boeing Company, Chicago, IL (US)

(72) Inventors: Jeffrey E Polus, Hillsboro, IL (US); David J. Sundquist, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 15/471,430

(22) Filed: Mar. 28, 2017

(65) Prior Publication Data

US 2017/0335079 A1 Nov. 23, 2017

Related U.S. Application Data

(60) Provisional application No. 62/339,561, filed on May 20, 2016.

(51) Int. Cl.
| | |
|---|---|
| *B29C 70/30* | (2006.01) |
| *C08J 7/16* | (2006.01) |
| *B29C 70/88* | (2006.01) |
| *B29C 70/54* | (2006.01) |
| *B05D 1/02* | (2006.01) |

(Continued)

(52) U.S. Cl.
CPC ............... *C08J 7/16* (2013.01); *B05D 1/02* (2013.01); *B29C 70/543* (2013.01); *B29C 70/887* (2013.01); *B64C 1/064* (2013.01); *B64C 1/065* (2013.01); *B64C 1/12* (2013.01); *C08J 5/042* (2013.01); *C08J 5/24* (2013.01); *C09D 5/031* (2013.01); *C09D 163/00* (2013.01);

(Continued)

(58) Field of Classification Search
CPC ...... B29C 70/543; B29C 70/887; B29C 70/30
See application file for complete search history.

(56) References Cited

U.S. PATENT DOCUMENTS 1,888,492 A * 11/1932 Dearden ............... D06N 7/0028
264/254
3,020,878 A * 2/1962 Andrews ................ B05B 12/24
118/301
(Continued)

FOREIGN PATENT DOCUMENTS

| JP | H09100360 A | 4/1997 |
|---|---|---|
| JP | H09241403 A | 9/1997 |

(Continued)

OTHER PUBLICATIONS

Endruweit, A., et al., "Characterisation of Prepreg Tack on Different Surfaces to Aid Automated Material Placement," 20th International Conference of Composite Materials, Jul. 19, 2015, Copenhagen, Denmark, pp. 1-11.

(Continued)

*Primary Examiner* — Matthew J Daniels
(74) *Attorney, Agent, or Firm* — Coats & Bennett, PLLC

(57) ABSTRACT

Methods and systems, and components made according to the methods and systems, are disclosed relating to improved methods for fabricating resin-containing composite prepreg materials, wherein the prepreg plies are treated with a particulate material to achieve predetermined spatially variable shear and tack values at a predetermined location on at least one prepreg ply surface of at least one prepreg ply.

21 Claims, 16 Drawing Sheets

(51) Int. Cl.
*B64C 1/06* (2006.01)
*B64C 1/12* (2006.01)
*C08J 5/04* (2006.01)
*C08J 5/24* (2006.01)
*C09D 5/03* (2006.01)
*C09D 163/00* (2006.01)

(52) U.S. Cl.
CPC ........ *C08J 2363/00* (2013.01); *C08J 2463/00* (2013.01); *Y02T 50/40* (2013.01)

(56) References Cited

U.S. PATENT DOCUMENTS

| | | | | |
|---|---|---|---|---|
| 3,472,730 | A | * | 10/1969 | Frigstad ................. B29C 70/00 156/182 |
| 4,943,472 | A | * | 7/1990 | Dyksterhouse ......... B29B 15/12 156/307.4 |
| 2001/0044518 | A1 | * | 11/2001 | Hoffmann ................ C08J 3/226 528/108 |
| 2007/0083001 | A1 | * | 4/2007 | Amrhein .................. C08J 3/122 524/567 |
| 2013/0149498 | A1 | | 6/2013 | Wilkerson et al. |
| 2014/0120332 | A1 | * | 5/2014 | Jalowka ................ B29C 70/443 428/212 |
| 2014/0374018 | A1 | * | 12/2014 | Creaser .................. B32B 37/26 156/286 |
| 2016/0159998 | A1 | | 6/2016 | Spencer et al. |
| 2018/0002504 | A1 | | 1/2018 | Kawamoto et al. |
| 2018/0326676 | A1 | | 11/2018 | Taketa et al. |

FOREIGN PATENT DOCUMENTS

| | | |
|---|---|---|
| JP | 2005213469 A | 8/2005 |
| JP | 2009051112 A | 3/2009 |
| JP | 2009220392 A | 10/2009 |
| WO | 2015007862 A1 | 1/2015 |
| WO | 2016001040 A1 | 1/2016 |
| WO | 2016111190 A1 | 7/2016 |
| WO | 2017110991 A1 | 6/2017 |

OTHER PUBLICATIONS

Crossley, R.J., et al., "Time-temperature equivalence in the tack and dynamic stiffness of polymer prepreg and its application to automated composites manufacturing," Composites: Part A, vol. 52, May 2, 2013, pp. 126-133; available at: http://dx.doi/10.1016/jcompositea.2013.05.002.

Crossley, R.J., et al., "The Experimental Characterisation of Prepreg Tack," ICCM International Conferences of Composite Materials, Jan. 1, 2009, pp. 1-11.

Extended European Search Report for Application No. 171719313.3-1703, dated Nov. 23, 2017.

* cited by examiner

PARTICULATE PREPREG FORMING AID

TECHNOLOGICAL FIELD

The present disclosure generally relates to the field of forming complex, three dimensionally-shaped objects and surfaces made from composite materials. More particularly, the present disclosure relates to methods, systems and apparatuses for forming complex three-dimensionally-shaped surfaces on composite parts for structures, including aircraft structures, such as, for the purpose of preparing predictable finished surfaces on the structures in their end use.

BACKGROUND

Composite laminates for aircraft structures often have precise and complex final shape requirements. According to known methods, production methods produce an uncured flat laminate by stacking plies of resin impregnated fiber, or "prepregs", that are then formed to the desired shape. However, except for simple forms with ruled surfaces, other shapes may result in less than desirable characteristics, such as, for example, wrinkling that may be produced during and after forming composite parts.

Wrinkling may often be mitigated by various approaches, each having drawbacks. For example, for the formation of certain non-ruled aircraft structures, such as joggled stringers, etc., attempts to overcome wrinkling have been attempted by altering the design of the joggle to a shallower ramp angle. However, such design alterations undesirably add to the weight of the object structure. Further, attempts at manual lamination have been tried for the fabrication of complex parts. However, the labor costs to effect the manual production can often be prohibitive. Further attempts to suppress wrinkles have included cutting fibers in specific areas, but such methods may not be structurally allowable depending upon the end use part or component. The application of heat may also facilitate the successful forming of a laminate, but requires more specialized equipment and additional utility costs. Such attempts help in some cases, but may impact mechanical properties of the resulting parts and thus may require design changes that result in a weight increase. Once again, such efforts have not produced reliable results without offsetting shortcomings, and the problems of mitigating significant cost due to wrinkled composite surfaces or sub-surfaces that must be reworked, repaired, or possibly even discarded persists.

SUMMARY

The present disclosure relates to methods, systems and apparatuses for fabricating an assembly, or laminate, of individual prepreg plies with spatially varying tack values across areas of at least one surface of each ply, thereby achieving spatially varying shear, and predetermined slippage between adjacently positioned prepreg ply surfaces. The adjacently positioned prepreg ply surfaces comprising spatially varying shear, and predetermined slippage between such adjacently positioned prepreg ply surfaces, can be used to form a laid-up prepreg ply assembly, or laminates comprising such prepreg plies and prepreg ply assemblies, component parts comprising the prepreg ply assembly or laminate, and larger structures comprising the component parts incorporating the improved composite prepreg ply assembly, as well as the prepreg plies, prepreg ply assemblies, or laminates made according to methods disclosed herein, and composite laminates and objects comprising the prepreg assemblies, or laminates made according to the methods disclosed herein.

According to an aspect of the disclosure, a method is disclosed for fabricating a prepreg ply comprising orienting the prepreg ply, with the prepreg ply comprising a prepreg ply front surface and a prepreg ply back surface; applying a predetermined amount of a particulate material to a predetermined location of at least one of the prepreg ply front surface and the prepreg ply back surface; and by a predetermined amount varying slippage of at least one of the prepreg ply front surface and prepreg ply back surface, or at least a predetermined location of at least one of the prepreg ply front surface and the prepreg ply back surface.

In a further aspect, in the step of, by a predetermined amount varying slippage, further comprising spatially varying tack of at least a predetermined location of at least one of the prepreg ply front surface and prepreg ply back surface.

In another aspect, in the step of, by a predetermined amount varying slippage, further comprising spatially varying shear between adjacent prepreg plies by spatially varying the tack of at least one of a prepreg ply front surface of a first prepreg ply and a prepreg back surface of a second prepreg ply, with the front surface of the first prepreg ply positioned adjacently to the back surface of a second prepreg ply.

In a further aspect, in the step of, by a predetermined amount varying slippage, the tack of the prepreg ply front surface varies from the tack of the prepreg ply back surface.

In another aspect, in the step of applying a predetermined amount of a particulate material to a predetermined location of at least one of the front surface and back surface of the prepreg ply, the particulate material comprises a resin-containing material.

In another aspect, in the step of applying a predetermined amount of a particulate material to a predetermined location of at least one of the prepreg ply front surface and prepreg ply back surface, the particulate material comprises a powdered material.

In another aspect, in the step of applying a predetermined amount of a particulate material to a predetermined location of at least one of the prepreg ply front surface and prepreg ply back surface, the particulate material comprises a powdered material, the powdered material comprising an average particle size diameter ranging from about 0.2 to about 10 microns.

In a further aspect, in the step of applying a predetermined amount of a particulate material to a predetermined location of at least one of the prepreg ply front surface and prepreg ply back surface, the particulate material comprises a B-stage epoxy resin.

In a further aspect, in the step of applying a predetermined amount of a particulate material to a predetermined location of at least one of the prepreg ply front surface and prepreg ply back surface, the particulate material comprises a resin-containing material including digylcidyl ethers of bisphenol A; diglycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl) isocyanurate (and isocyanurates); glycerol diglycidyl ether; trimethylolpropane triglycidyl ether, or combinations thereof. In a further aspect, the particulate material comprises a curative compound including, without limitation, 4,4"-diamino diphenyl sulfone; 3,3"-diamino diphenyl sulfone, diethyl toluene dianiline; or combinations thereof.

A further aspect is directed to a method for fabricating a prepreg ply assembly comprising orienting a plurality of prepreg plies, with the prepreg plies each comprising a prepreg ply front surface and a prepreg ply back surface; applying a predetermined amount of a particulate material to at least a predetermined location of at least one of the prepreg ply front surface and prepreg ply back surface of at least one of a predetermined number of the prepreg plies; and by a predetermined amount varying slippage of at least one of the prepreg ply front surface and the prepreg ply back surface of at least a predetermined location of at least one of the prepreg ply front surface and prepreg ply back surface of at least one of the predetermined number of prepreg plies; and orienting a plurality of the prepreg plies into a prepreg assembly.

In another aspect, in the step of by a predetermined amount varying slippage, further comprising spatially varying tack of a location of at least one of the prepreg ply front surface and prepreg ply back surface of at least one of a predetermined number of prepreg plies.

In another aspect, in the step of, by a predetermined amount varying slippage, further comprising spatially varying shear between surfaces of adjacent prepreg plies in the prepreg ply assembly by spatially varying the tack of at least one of a prepreg ply front surface of a first prepreg ply and a prepreg back surface of a second prepreg ply, with the front surface of the first prepreg ply positioned adjacently to the back surface of a second prepreg ply.

In a further aspect, in the step of, by a predetermined amount varying slippage, the tack of the prepreg ply front surface varies from the tack of the prepreg ply back surface positioned adjacently to the prepreg ply front surface.

In a further aspect, in the step of applying a predetermined amount of a particulate material to a predetermined location of at least one of the prepreg ply front surface and prepreg ply back surface of the prepreg ply, the particulate material comprises a resin-containing material.

In a further aspect, in the step of applying a predetermined amount of particulate material to a predetermined location of at least one of the prepreg ply front surface and prepreg ply back surface of the prepreg ply, the particulate material comprises a powdered material.

In another aspect, in the step of applying a predetermined amount of a particulate material to a predetermined location of at least one of the prepreg ply front surface and prepreg ply back surface of the prepreg ply, the particulate material comprises a powdered epoxy resin-containing material.

In a further aspect, in the step of applying a predetermined amount of particulate material to a predetermined location of at least one of the prepreg ply front surface and prepreg ply back surface of the prepreg ply, the particulate material comprises a B-stage epoxy resin-containing material.

In a further aspect, in the step of applying a predetermined amount of a particulate material to a predetermined location of at least one of the prepreg ply front surface and prepreg ply back surface, the particulate material comprises an epoxy resin-containing material including digylcidyl ethers of bisphenol A; dicgycidyl ethers of bisphenol F; N,N,N', N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2, 3-epoxypropyl)isocyanurate (and isocyanurates); glycerol diglycidyl ether; trimethylolpropane triglycidyl ether, or combinations thereof.

In another aspect, the particulate material further comprises at least one curative compound including, without limitation, 4,4"-diamino diphenyl sulfone; 3,3"-diamino diphenyl sulfone; diethyl toluene dianiline; or combinations thereof.

In another aspect, before the step of orienting the plurality of prepreg plies, further comprising applying a masking material to at least one of the prepreg ply front surface and the prepreg ply back surface of a predetermined number of prepreg plies.

In another aspect, in the step of applying a masking material to at least one of the prepreg ply front surface and the prepreg ply back surface of at least one prepreg ply, the masking material comprises paper; a polyethylene film, a polyfluoride film, etc., or combinations thereof.

In a further aspect, after the step of applying a predetermined amount of a particulate to a predetermined location of at least one of the front surface and back surface of a prepreg ply, further comprising: removing the applied masking material from the prepreg ply.

In another aspect, after orienting a plurality of the prepreg plies into a prepreg ply assembly, further comprising orienting the prepreg ply assembly onto a tool.

In another aspect, after orienting a plurality of the prepreg plies into a prepreg ply assembly, further comprising forming the prepreg ply assembly onto a tool.

In another aspect, after orienting the prepreg ply assembly onto a tool, further comprising curing the prepreg ply assembly.

In still another aspect, a contemplated method of forming a prepreg ply assembly further comprises orienting the plurality of prepreg plies onto a tool, with the tool comprising a forming mandrel.

Another aspect is directed to a prepreg ply assembly comprising a plurality of prepreg plies, with the prepreg plies comprising a prepreg ply front surface and a prepreg ply back surface, a predetermined amount of a particulate material on at least one of the prepreg ply front surface and prepreg ply back surface of at least a predetermined number of prepreg plies, and wherein at least one of the prepreg ply front surface and prepreg ply back surface of at least one prepreg ply is configured to comprise a predetermined amount of slippage between adjacent prepreg plies in the prepreg ply assembly.

Another aspect is directed to a prepreg ply assembly comprising a plurality of prepreg plies, with the prepreg plies comprising a prepreg ply front surface and a prepreg ply back surface, a predetermined amount of a particulate material on at least one of the prepreg ply front surface and prepreg ply back surface of at least a predetermined number of prepreg plies, and wherein at least one of the prepreg ply front surface and prepreg ply back surface of at least one prepreg ply is configured to comprise a predetermined amount of slippage and/or a predetermined amount of shear between adjacent prepreg plies in the prepreg ply assembly.

In a further aspect, at least one of the prepreg ply front surface and prepreg ply back surface of at least one of the plurality of prepreg plies is configured to comprise a predetermined amount of the particulate material applied to at least a predetermined location on at least one of the prepreg ply front surface and prepreg ply back surface of a predetermined number of prepreg plies in the prepreg ply assembly.

In another aspect, the particulate material comprises a powdered material.

In another aspect, the particulate material comprises a powdered resin-containing material.

In another aspect, the particulate material comprises an epoxy resin-containing material.

In another aspect, the particulate material comprises a powdered epoxy resin-containing material.

In another aspect, the powdered epoxy resin comprises a B-stage epoxy resin.

In another aspect, the powdered epoxy resin material comprises epoxy resin-containing material including digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

In another aspect, the particulate material further comprises at least one curative compound including, without limitation, 4,4"-diamino diphenyl sulfone; 3,3"-diamino diphenyl sulfone; diethyl toluene dianiline; or combinations thereof.

Another aspect of the present disclosure contemplates a composite material comprising a prepreg assembly made according to a method comprising orienting a plurality of prepreg plies, said prepreg plies each comprising a prepreg ply front surface and a prepreg ply back surface; applying a predetermined amount of a particulate to at least a predetermined location of at least one of the front surface and back surface of a predetermined number of the prepreg plies, and by a predetermined amount varying slippage of at least one of the front surface and the back surface of at least a predetermined location of at least one of the prepreg ply front surface and prepreg ply back surface of at least one prepreg ply.

A further aspect of the present disclosure contemplates a cured composite material comprising a prepreg assembly made according to a method comprising orienting a plurality of prepreg plies, with the prepreg plies each comprising a prepreg ply front surface and a prepreg ply back surface; applying a predetermined amount of a particulate to at least a predetermined location of at least one of the prepreg ply front surface and prepreg ply back surface of a predetermined number of the prepreg plies, and by a predetermined amount varying slippage of at least one of the prepreg ply front surface and the prepreg ply back surface of at least a predetermined location of at least one of the prepreg ply front surface and prepreg ply back surface of at least one prepreg ply.

Another aspect of the disclosure is directed to a composite laminate comprising a prepreg ply assembly, with the prepreg ply assembly comprising a plurality of prepreg plies, with the prepreg plies comprising a prepreg ply front surface and a prepreg ply back surface, and wherein at least one of the prepreg ply front surface and prepreg ply back surface of at least one prepreg ply comprises spatially variable shear between the prepreg ply front surface and the prepreg ply back surface of adjacent prepreg plies.

A further aspect of the disclosure is directed to a cured composite laminate comprising a prepreg ply assembly, with the prepreg ply assembly comprising a plurality of prepreg plies, with the prepreg plies comprising a prepreg ply front surface and a prepreg ply back surface, and wherein at least one of the prepreg ply front surface and prepreg ply back surface of at least one prepreg ply comprises spatially variable shear between the prepreg ply front surface and the prepreg ply back surface of adjacent prepreg plies.

Another aspect of the present disclosure is directed to an object comprising a cured composite laminate comprising a prepreg ply assembly, with the prepreg ply assembly comprising a plurality of prepreg plies, with the prepreg plies comprising a prepreg ply front surface and a prepreg ply back surface, and wherein at least one of the prepreg ply front surface and prepreg ply back surface of at least one prepreg ply comprises spatially variable shear between the prepreg ply front surface and the prepreg ply back surface of adjacent prepreg plies.

In another aspect, the object is a stationary object.

In a further aspect, the object is a vehicle.

In another aspect, the object is a vehicle selected from the group consisting of: a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface marine vehicle, an unmanned surface marine vehicle, a manned sub-surface marine vehicle, an unmanned sub-surface marine vehicle, and combinations thereof.

In still another aspect, a contemplated method of forming a composite laminate further comprises orienting the plurality of prepreg plies onto a tool, with the tool comprising a forming mandrel.

In another aspect, the spatially variable tack of at least one of the prepreg ply front surface and the prepreg ply back surface ranges from about 1 $N/m^2$ to about 100 $N/m^2$.

In another aspect, the spatially variable tack of at least one of the prepreg ply front surface and the prepreg ply back surface varies and can be tailored to effect a predetermined tack value change ranging from about 0% to about 86% tack reduction.

In a further aspect, the interlaminar shear (e.g. the shear between adjacently positioned prepreg plies) can vary from about 1 $N/m^2$ to about 1500 $N/m^2$.

In a further aspect, the interlaminar shear (e.g. the shear between adjacently positioned prepreg plies) can vary and can be tailored to effect an interlaminar shear reduction ranging from about 0% to about 97% interlaminar shear reduction.

In another aspect, the spatially variable shear on at least one of the prepreg ply front surface and the prepreg ply back surface is configured to mitigate, reduce or eliminate wrinkle formation in the prepreg ply assembly, the composite laminate comprising the prepreg ply assembly, and objects comprising the composite laminate.

BRIEF DESCRIPTION OF THE DRAWINGS

Figure 1:
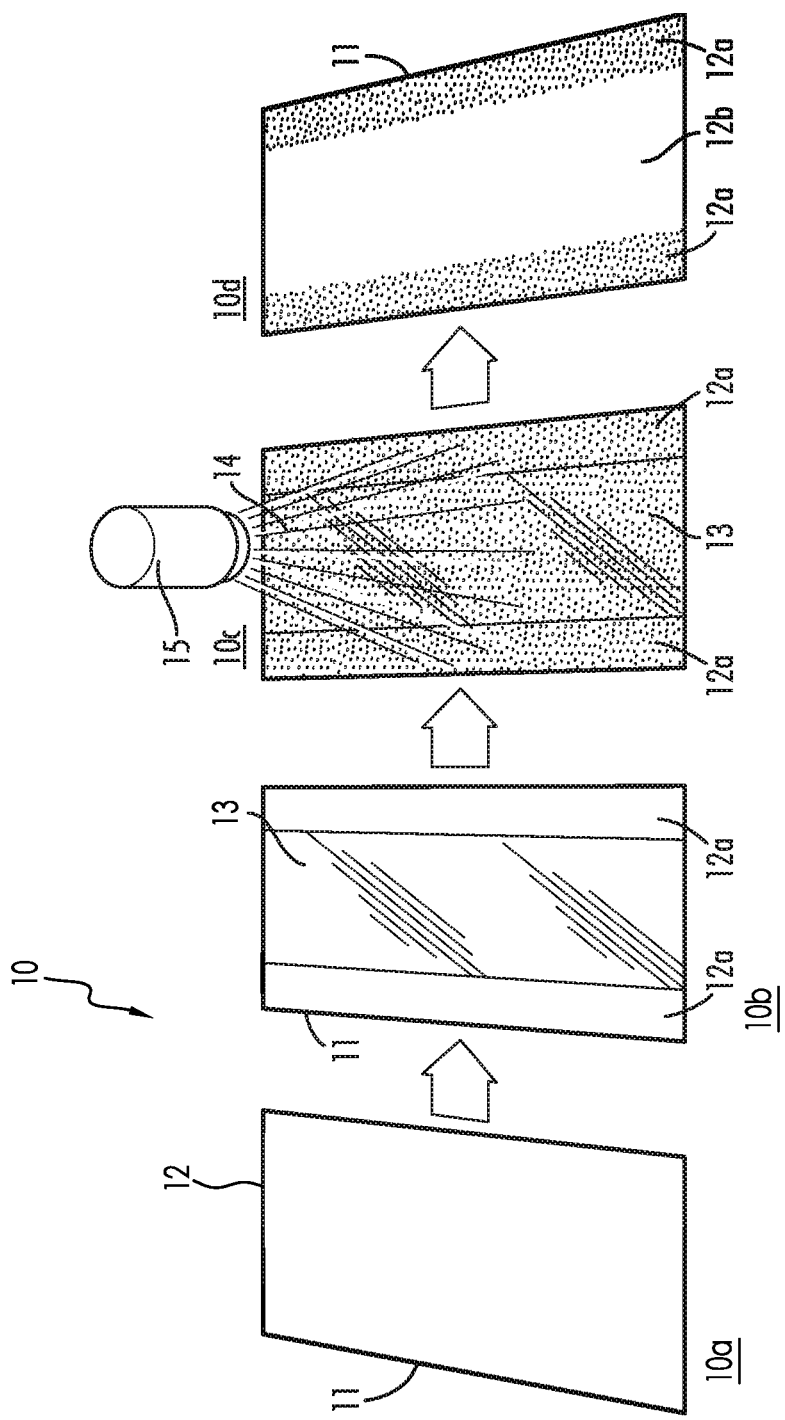
Figure 2:
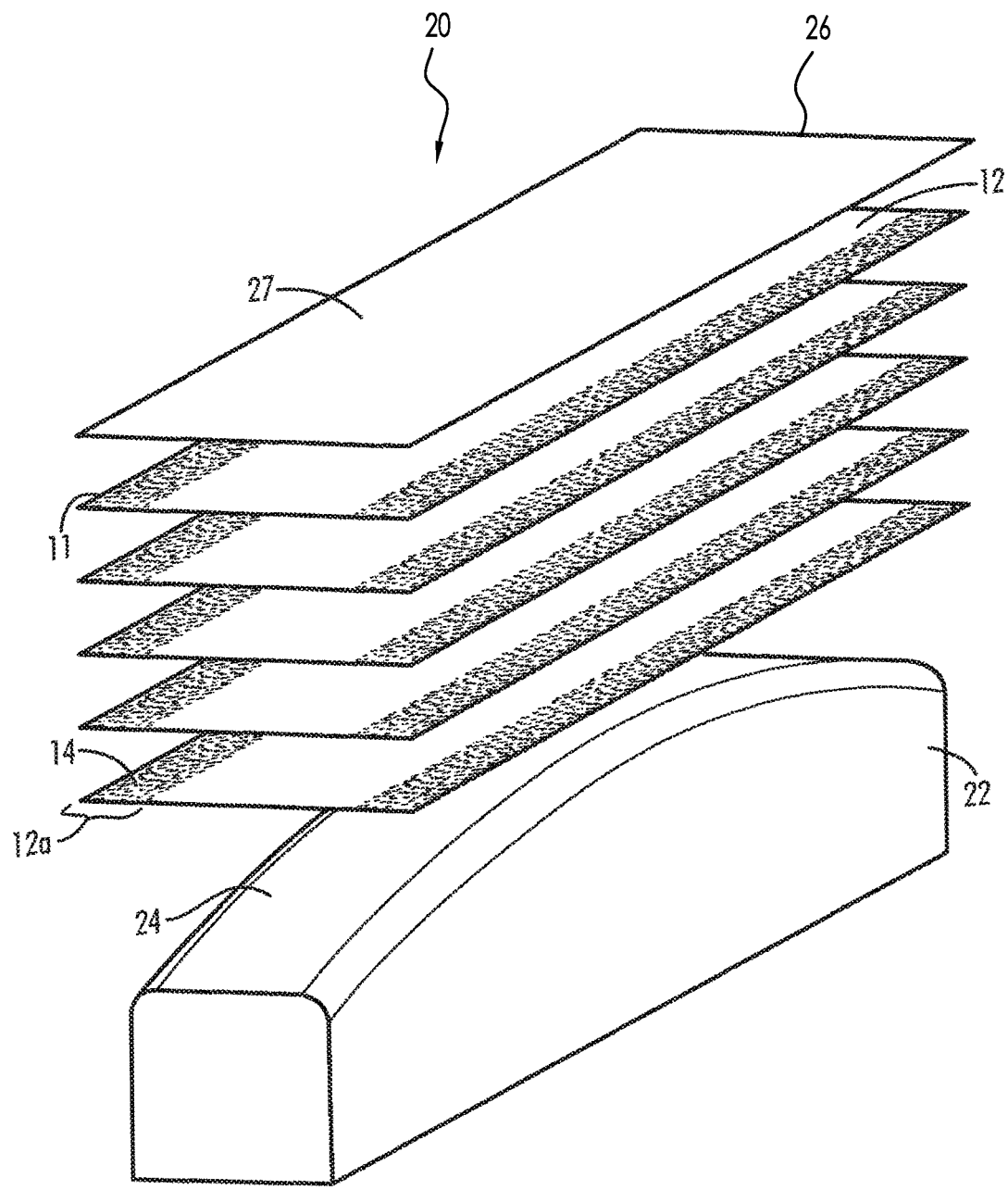
Figure 3A:
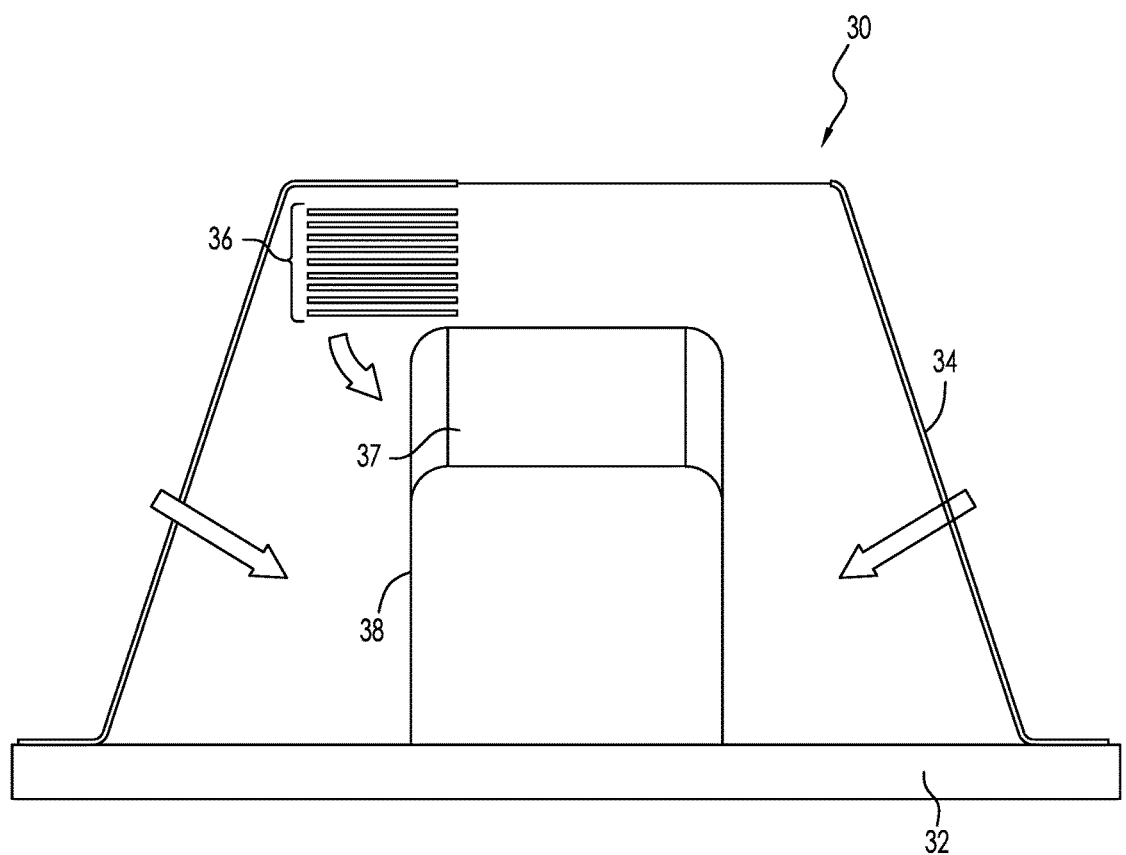
Figure 3B:
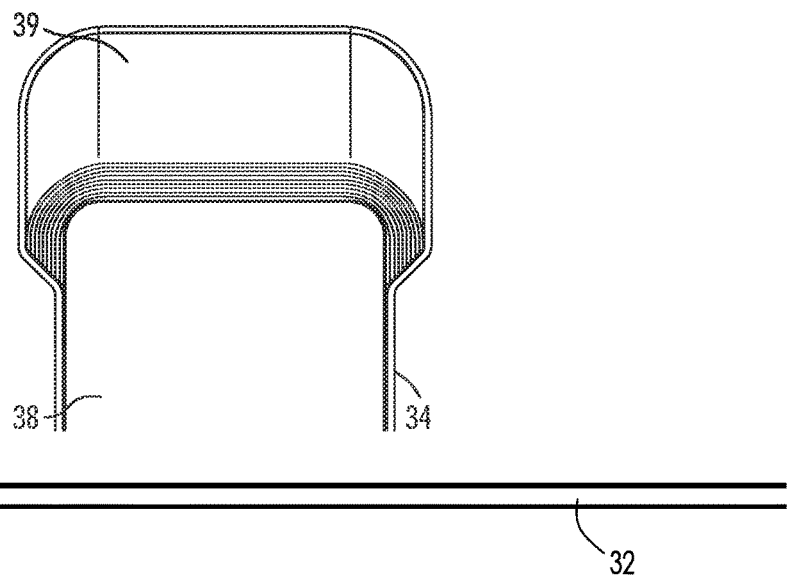
Figure 4A:
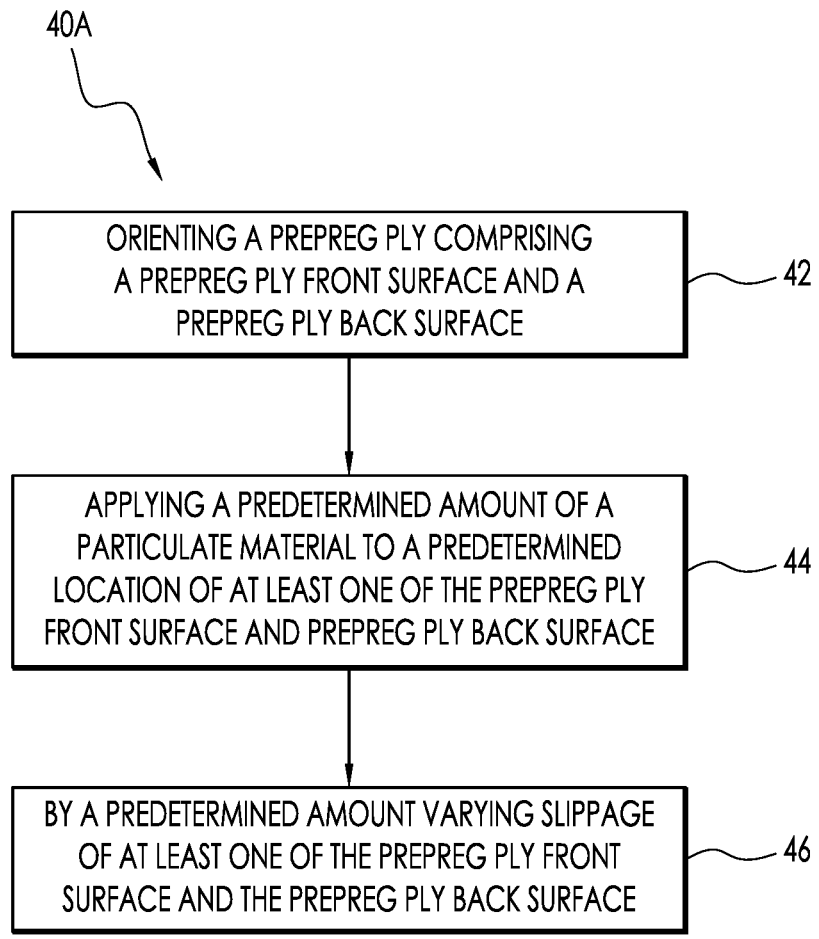
Figure 4B:
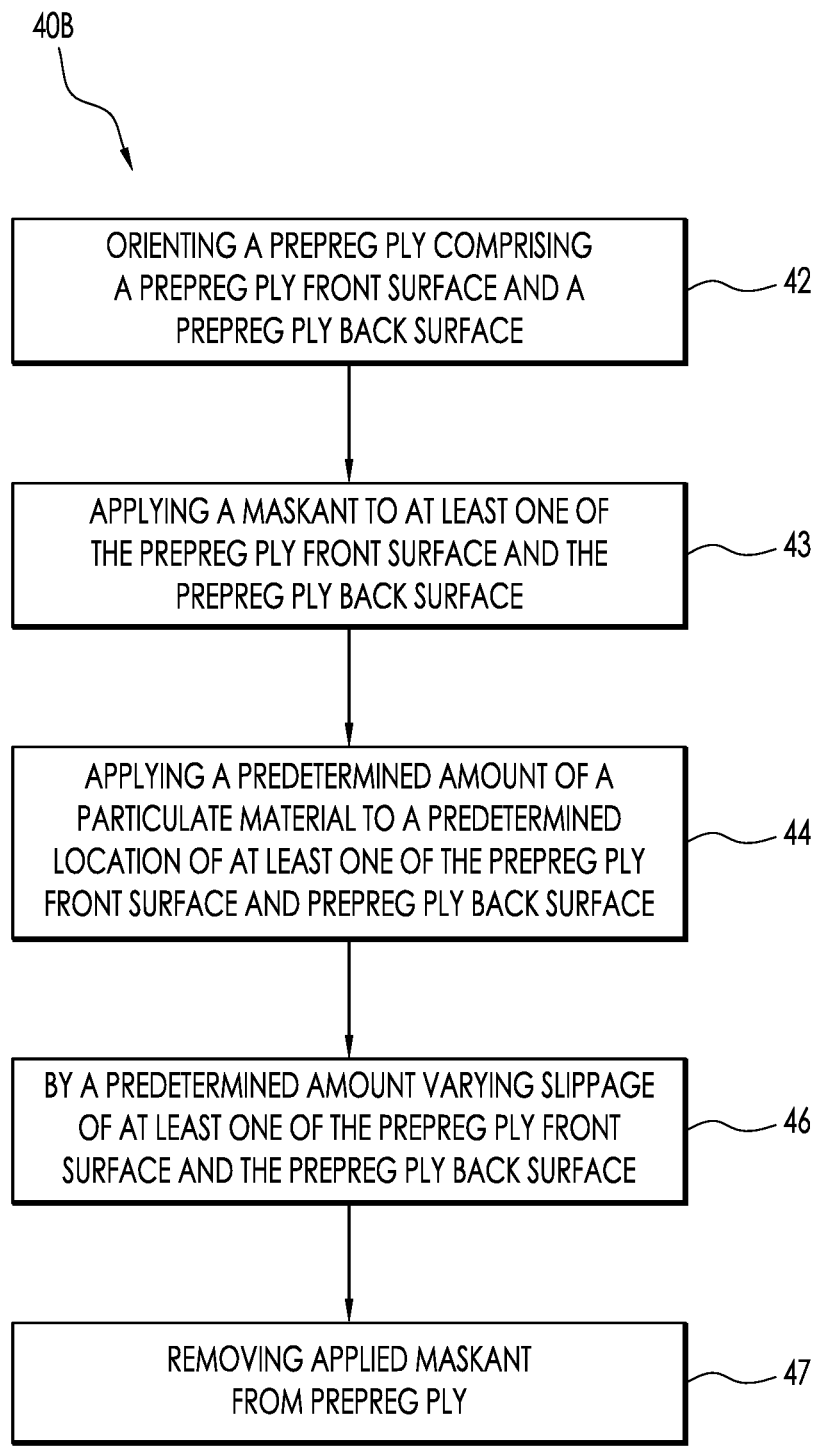
Figure 5A:
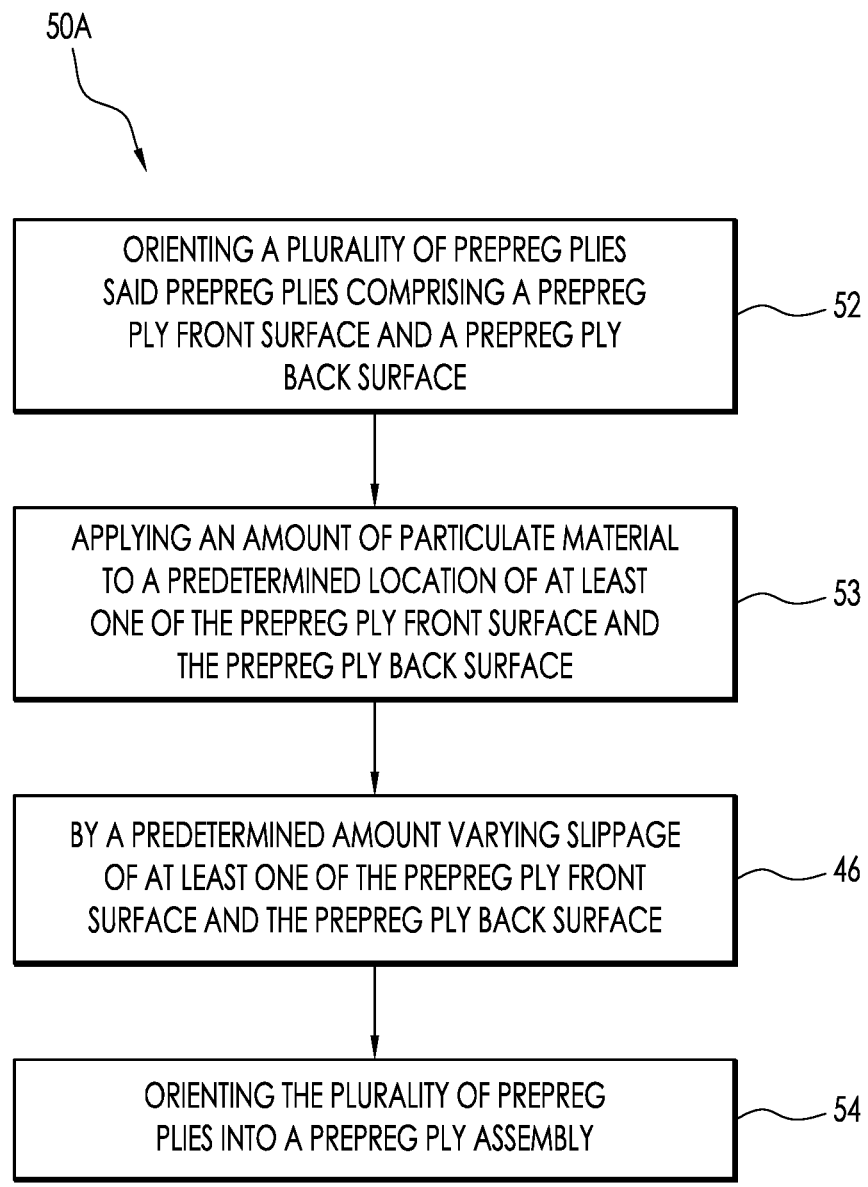
Figure 5B:
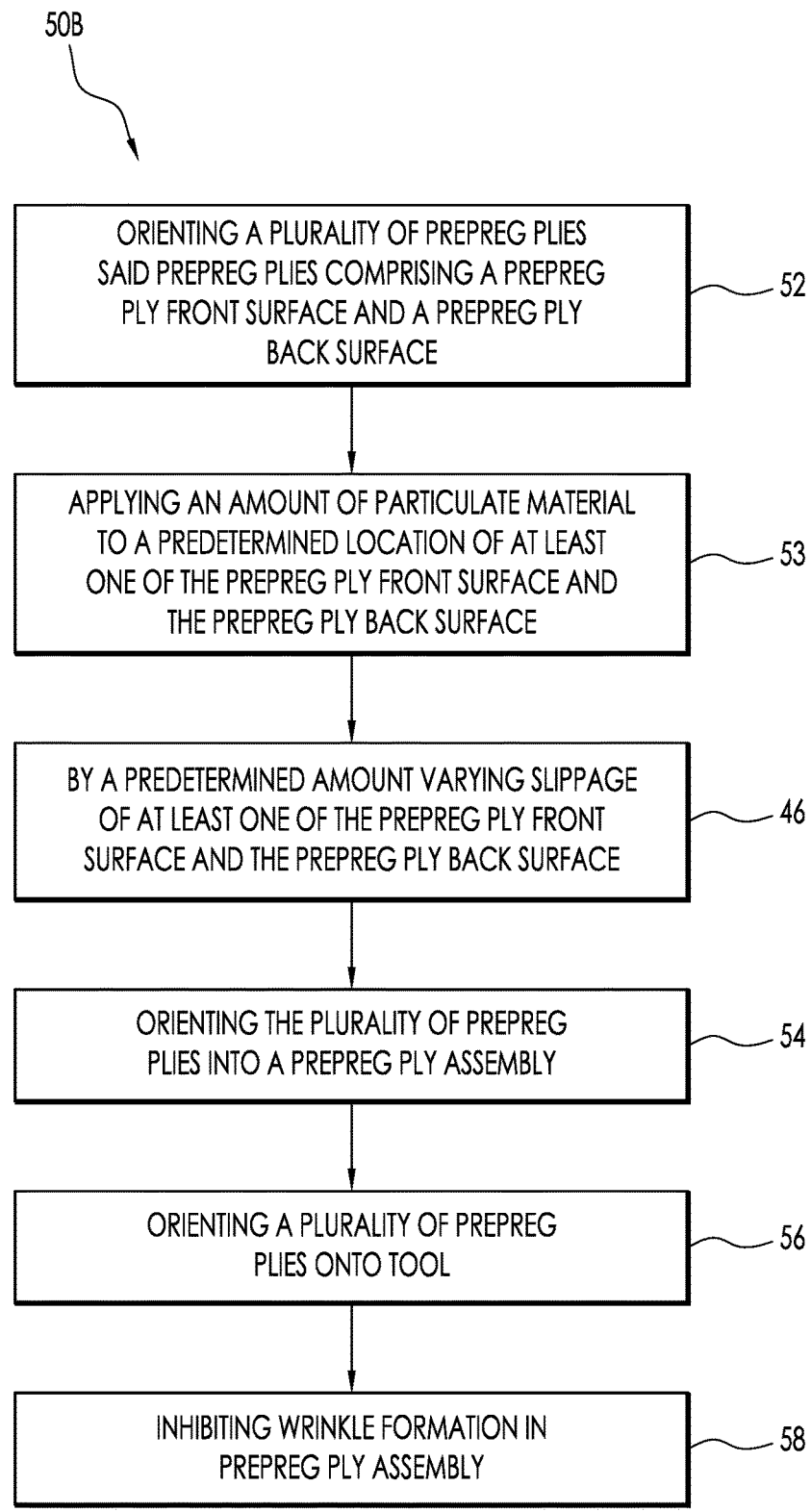
Figure 6A:
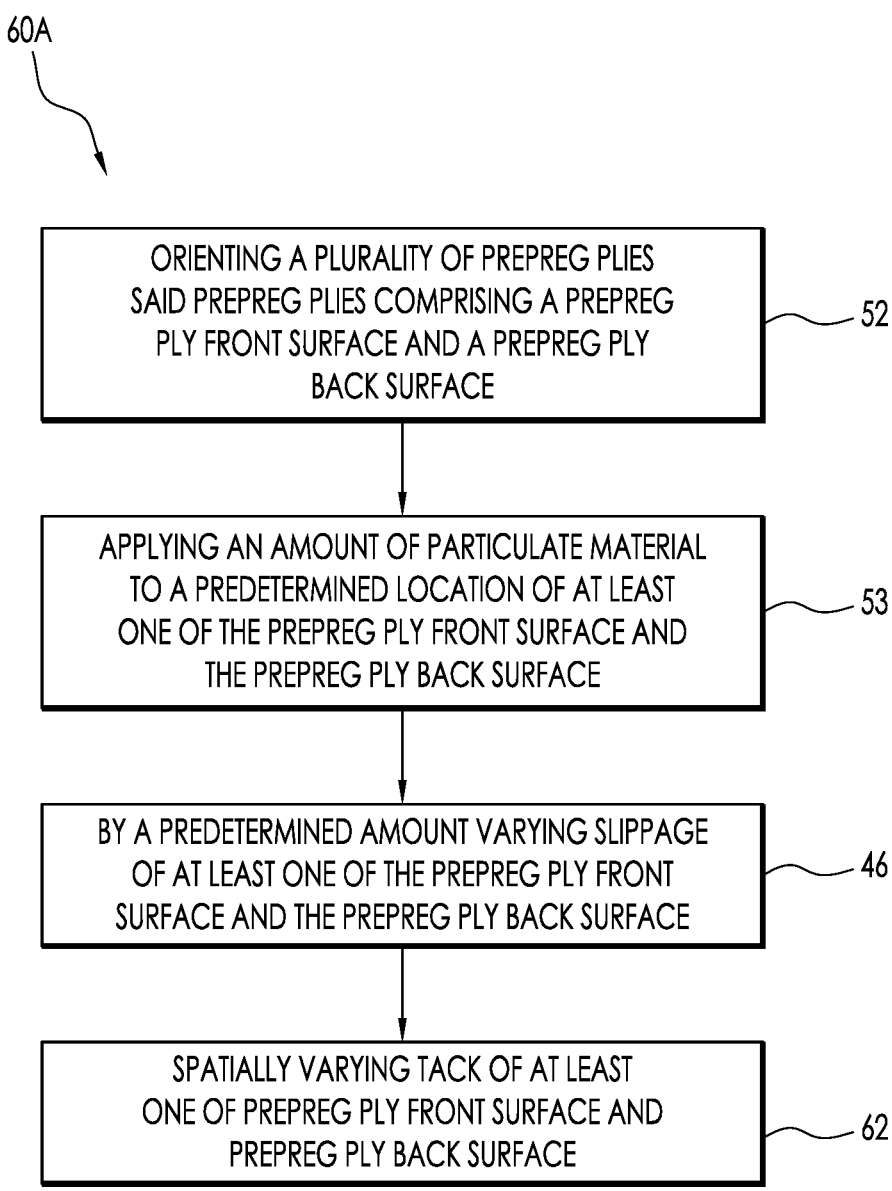
Figure 6B:
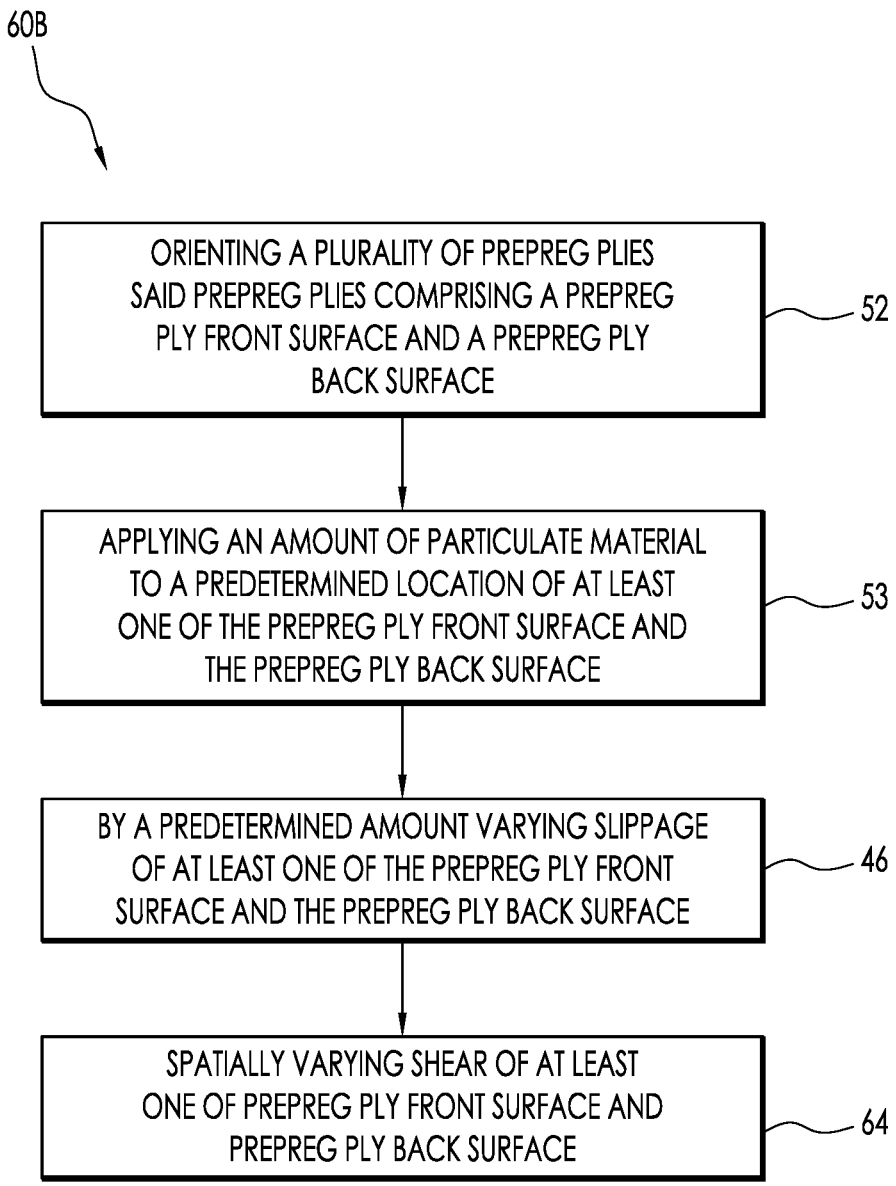
Figure 7A:
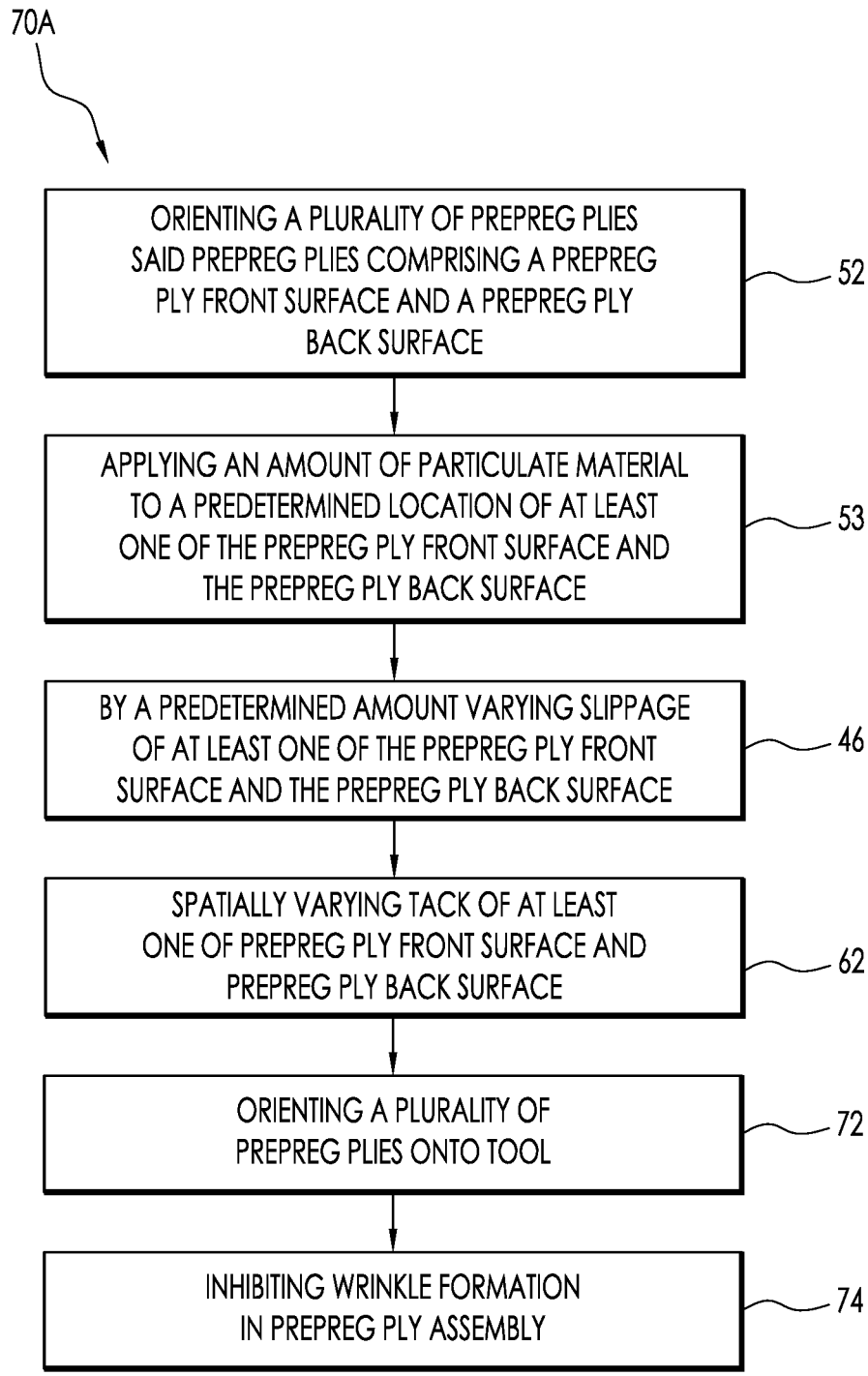
Figure 7B:
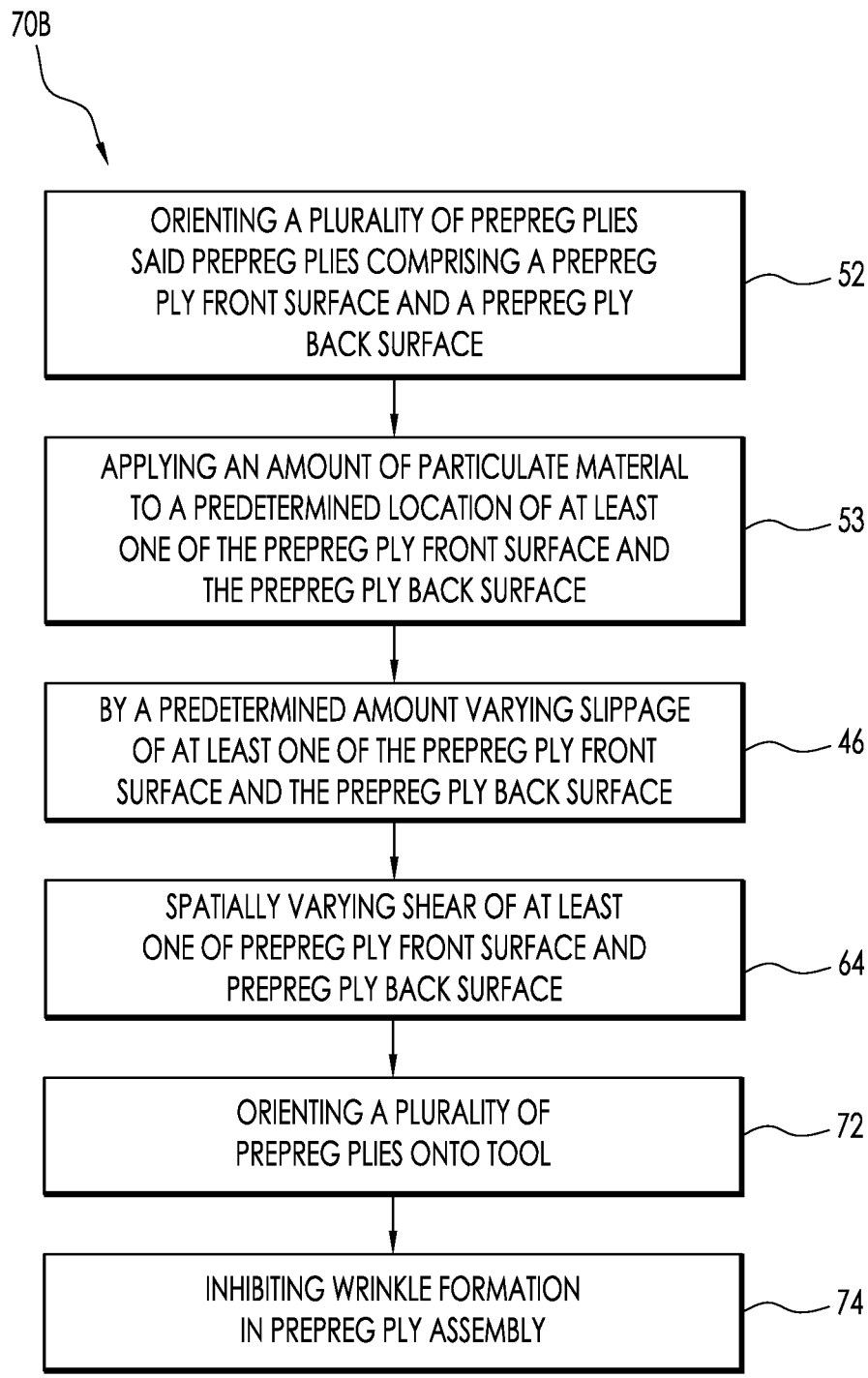
Figure 7C:
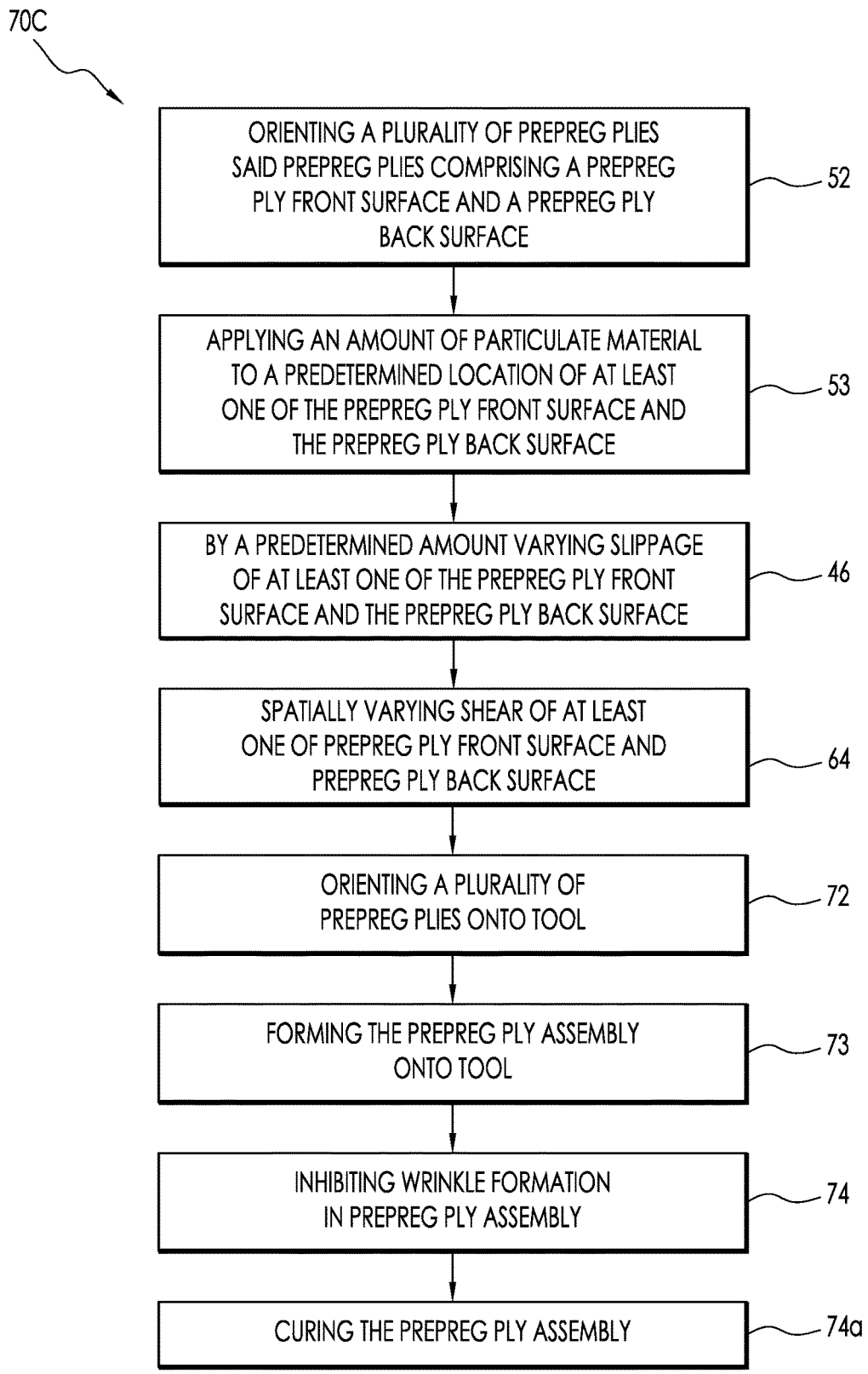
Figure 8:
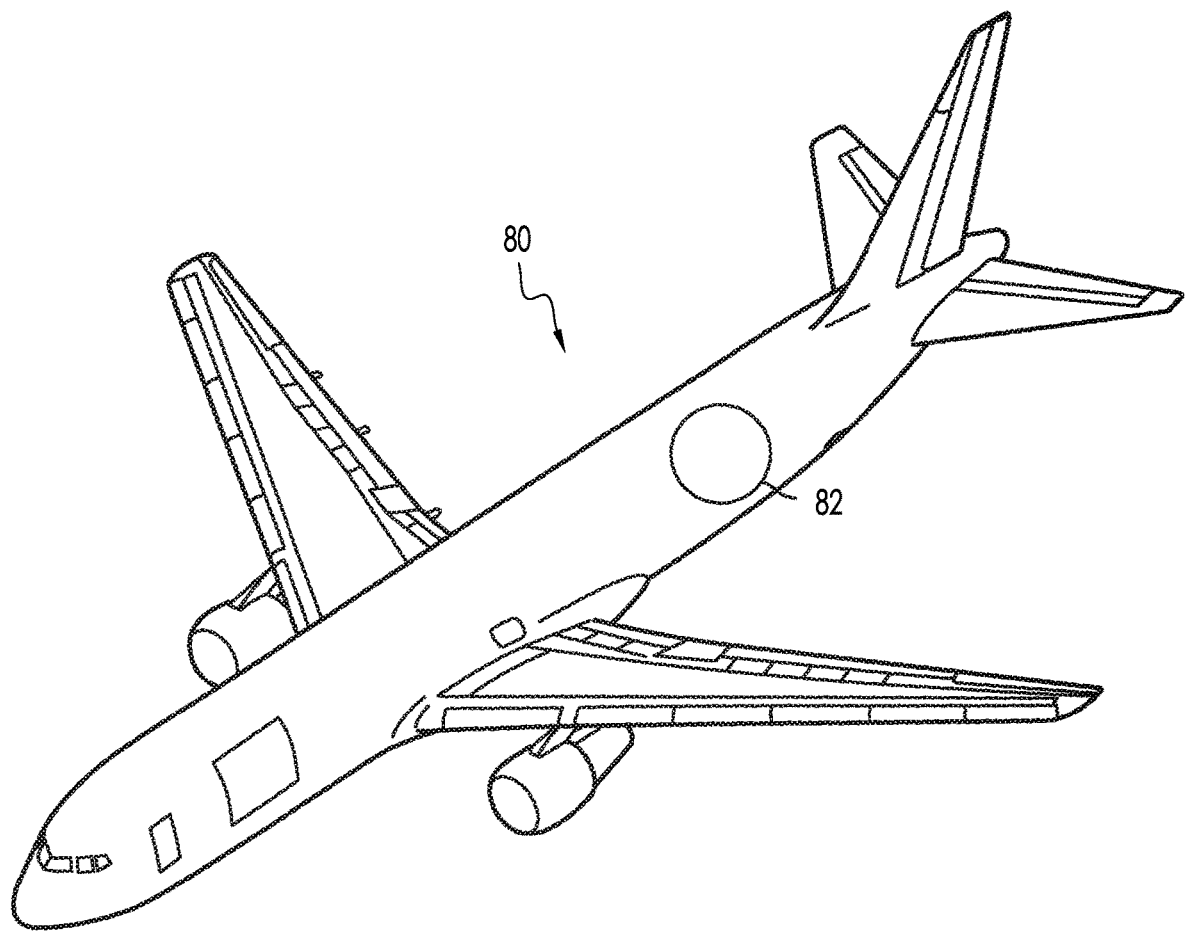
Figure 9:
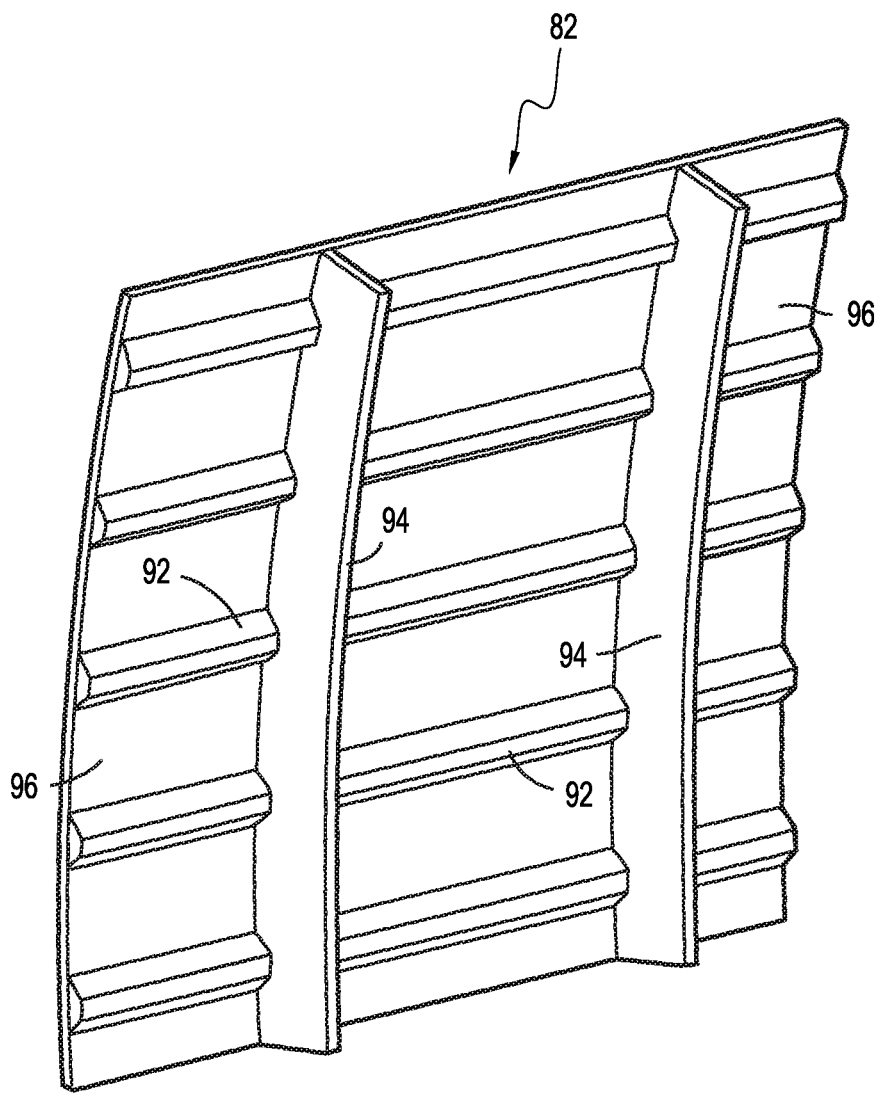
Figure 10:
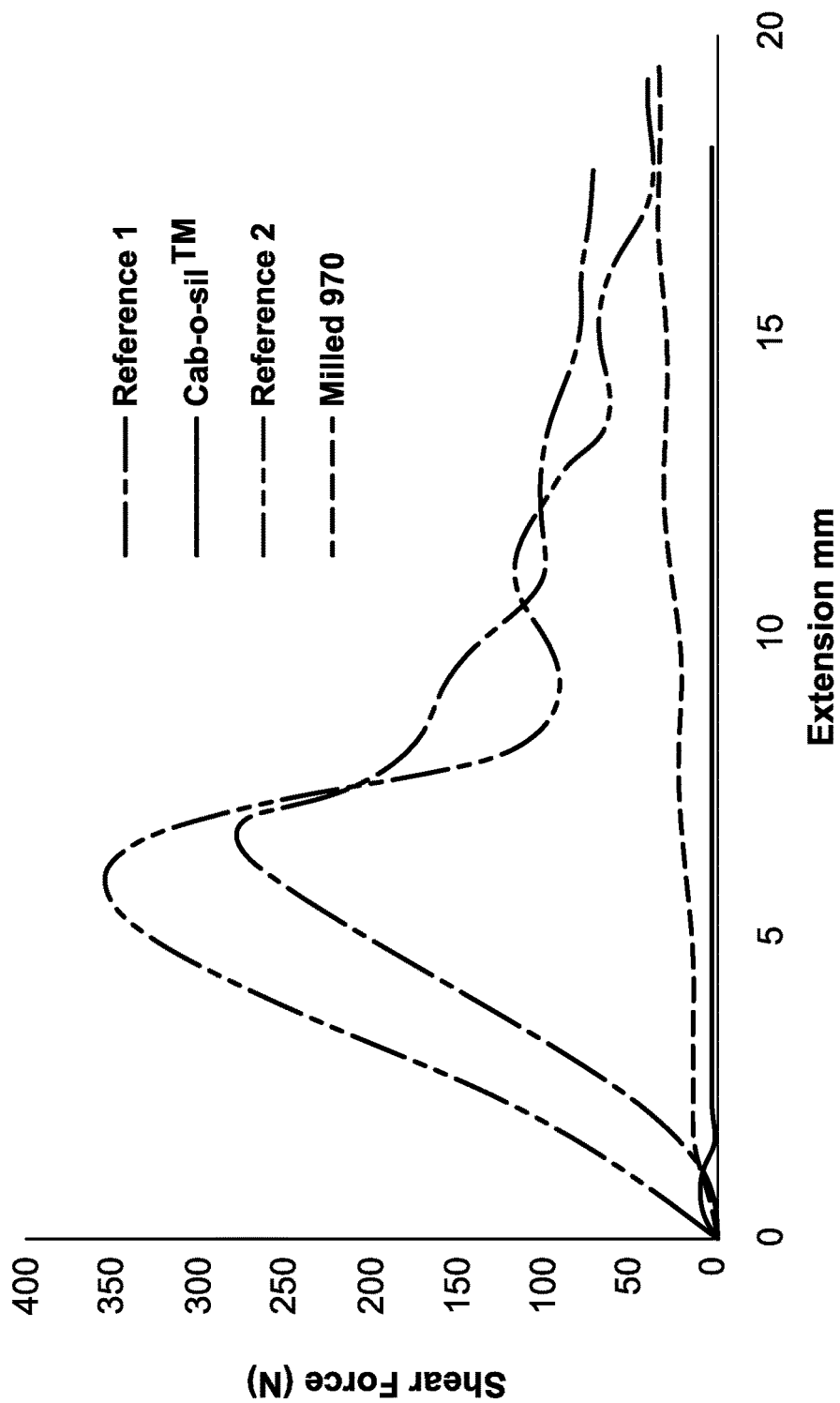

Having thus described variations of the disclosure in general terms, reference will now be made to the accompanying drawings, which are not necessarily drawn to scale, and wherein:

FIG. 1 is perspective view of a section of epoxy-containing prepreg progressing through a series of treatment steps, according to an aspect of the present disclosure;

FIG. 2 is a perspective view of a stack of treated portions of epoxy-containing prepreg plies about to be laid up on a forming mandrel, according to an aspect of the present disclosure;

FIG. 3A is a side perspective view of a stack of treated portions of epoxy-containing prepreg plies about to be laid up on a forming mandrel within a vacuum chamber to form a prepreg assembly, according to an aspect of the present disclosure;

FIG. 3B is a side view of the epoxy-containing prepreg assembly shown in FIG. 3A, with the epoxy-containing prepreg plys now formed into a desired shape over the forming mandrel according to an aspect of the present disclosure;

FIG. 4A is a flow diagram outlining aspects of the present disclosure;

FIG. 4B is a flow diagram outlining aspects of the present disclosure;

FIG. 5A is a flow diagram outlining aspects of the present disclosure;

FIG. 5B is a flow diagram outlining aspects of the present disclosure;

FIG. 6A is a flow diagram outlining aspects of the present disclosure;

FIG. 6B is a flow diagram outlining aspects of the present disclosure;

FIG. 7A is a flow diagram outlining aspects of the present disclosure;

FIG. 7B is a flow diagram outlining aspects of the present disclosure;

FIG. 7C is a flow diagram outlining aspects of the present disclosure;

FIG. 8 is drawing of an aircraft comprising component parts made according to aspects of the present disclosure;

FIG. 9 is a drawing of an exposed interior of a fuselage section (as shown in FIG. 8) showing component parts made according to aspects of the present disclosure; and FIG. 10 is a graph showing test results of the shear of test and reference samples.

DETAILED DESCRIPTION

Aspects of the present disclosure are directed to producing improved composite components made from composite prepregs, including epoxy-containing prepregs, wherein individual composite prepreg layers, otherwise referred to as plies or prepreg plies, are treated prior to prepreg ply assembly to spatially vary slippage, and/or tack, and/or shear across the front and/or back of a predetermined number of the prepreg plies, to substantially minimize, substantially reduce, substantially ameliorate or substantially eliminate wrinkling that may ordinarily occur during prepreg laminate and/or composite formation, especially prepregs and prepreg assemblies or prepreg laminates that are formed into three-dimensional composite end-use configurations. For purposes of the present disclosure, the terms "shear force", "shear force value" and "shear" are used interchangeably as equivalent terms. The properties that impact slippage, shear and tack characteristics of a surface interrelate, but are not necessarily controlled by one another. Without being bound to any particular theory, it is believed that aspects of the present disclosure are also therefore directed to and otherwise contemplate applying a predetermined amount of a particulate material to predetermined locations and/or regions of a prepreg ply surface (e.g. a prepreg ply front surface and/or a prepreg ply back surface) to vary slippage and/or minimize, reduce or ameliorate a prepreg ply surface's shear and/or tack for the purpose of substantially minimizing, substantially reducing, substantially ameliorating and/or substantially eliminating wrinkling that may ordinarily occur during composite material formation, especially prepregs that are used to make composite materials that are formed into a three-dimensional composite end-use configuration, and wrinkling that otherwise may form in parts or components made from prepreg ply assemblies. In this way, the prepreg ply front and/or prepreg ply back surfaces so treated with predetermined amounts of particulate material at predetermined locations or regions of a predetermined number of the prepreg ply front surfaces and/or prepreg ply back surfaces of a predetermined number of prepreg plies are said to comprise predetermined spatially varying slippage, shear and/or tack across at least one of the surfaces of a prepreg ply, and therefore within a prepreg ply assembly. For the purpose of this disclosure, the terms "prepreg ply assembly", "laid-up prepreg plies", "laid-up prepreg ply assembly", "prepreg ply laminate", "prepreg ply stack", "stack assembly" and "laminate" are equivalent terms that may be used interchangeably.

In another aspect, the spatially variable tack of at least one of the prepreg ply front surface and the prepreg ply back surface ranges from about 1 $N/m^2$ to about 100 $N/m^2$, and with the spatially variable tack of at least one of the prepreg ply front surface and the prepreg ply back surface varying and capable of being tailored to a predetermined degree from an amount ranging from about 0% to about 86% tack reduction.

In addition the interlaminar shear (e.g. the shear between adjacently positioned prepreg plies) can vary from about 1 $N/m^2$ to about 1500 $N/m^2$, and the interlaminar shear (e.g. the shear between adjacently positioned prepreg plies) can vary and can therefore be tailored to a predetermined degree to be reduced from amount ranging from about 0% to about 97% interlaminar shear reduction.

According to the present disclosure, the term "interlaminar shear" refers to the varying degree of shear observed between adjacent prepreg ply surfaces (e.g. the front surface of a first prepreg ply positioned adjacently to the back surface of a second prepreg ply, or the back surface of a first prepreg ply positioned adjacently to the front surface of a second prepreg ply).

The prepregs plies of the present disclosure are understood to be composite prepregs comprising a fiber component and a resin-containing component. Contemplated fibers for use in the prepreg plies include, without limitation, carbon fibers, glass fibers, aramid fibers, boron fibers, etc., and combinations thereof.

The resin-component is preferably an epoxy resin, although aspects of the present disclosure contemplate improving the processing of any composite material fabricated by associating a plurality of plies into a composite material comprising a prepreg ply assembly, where the fiber component may be any suitable fiber material used to fabricate composite materials, and the resin component may be any suitable resin component used to fabricate composite materials.

Contemplated epoxy resin-containing materials include, without limitation, B-stage epoxy resin-containing materials including, without limitation, digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, etc., or combinations thereof, with at least one curative compound including, without limitation, 4,4"-diamino diphenyl sulfone; 3,3"-diamino diphenyl sulfone; diethyl toluene dianiline, etc. Additional curative compounds may be added, including, without limitation, 4,4"-diamino diphenyl sulfone; 3,3"-diamino diphenyl sulfone; diethyl toluene dianiline, etc.

According to aspects of the present disclosure, the epoxy resin-containing prepreg material may be manufactured into a partially cured state and stored in the partially cured, or "staged" state, in rolls or sheets until ready to be laid up, for example, onto forming tools including, without limitation, shaping and forming mandrels. The staged epoxy resin-containing prepreg material preferably has a viscosity ranging from about 60,000 poise to about 1000 poise.

According to further aspects, the present disclosure contemplates processing methods for making prepreg plies and prepreg ply assemblies, where a particulate material, (e.g. a powdered material, such as a powdered resin material that may comprise a powdered epoxy resin-containing material), is produced and then a predetermined amount of the particulate material is dispensed in predetermined amounts to predetermined portions, predetermined regions or predetermined locations on at least one surface of a prepreg ply (e.g. prepreg ply front surface or prepreg ply back surface) that comprises a resin-containing material. The particulate material applied to predetermined locations on a predetermined number of a prepreg ply surface serves to lower the shear and/or tack of the prepreg ply surfaces by a predetermined amount, and allows a predetermined degree of slippage of the adjacent prepreg plies relative to one another during processing. The predetermined amount of slippage ameliorates and/or substantially eliminates the occurrence of wrinkles in the composite product made from the prepreg assemblies that otherwise occur during prepreg layup and prepreg assembly processing for composite formation.

According to an aspect of the present disclosure, the predetermined amount of particulate material (e.g. powdered resin-containing material) required to ameliorate and/or substantially eliminate wrinkle formation during prepreg assembly and composite formation is the amount of particulate material required to lower a prepreg ply surface tack value from its initial tack value to a tack value ranging from about 1 N/m$^2$ to about 100 N/m$^2$. The decreased or "lower tack value", (reduction by an amount ranging from about 0% to about 86% reduction in tack value) achieved by aspects of the present disclosure are in strong contrast to typical tack values of starting (untreated/unpowdered) prepreg ply materials, where the surface tack values range from about 17 N/m$^2$ to about 25 N/m$^2$, or more. Thus, aspects of the methods disclosed herein achieve a significant prepreg surface tack reduction and interlaminar shear reduction between prepreg plies that facilitates a predetermined and increased degree of slippage of individual, adjacently positioned prepreg plies relative to one another during composite formation, and that results in a significant reduction and/or elimination of wrinkle formation in the finished composite materials after composite formation.

According to another aspect of the present disclosure, the predetermined amount of particulate material (e.g. powdered resin-containing material) required to ameliorate and/or substantially eliminate wrinkle formation during prepreg assembly is the amount required to lower a prepreg ply surface shear from its initial (i.e. untreated) shear value to a second shear value that facilitates a predetermined degree of slippage between adjacently positioned prepreg plies to significantly reduce or substantially eliminate wrinkle formation in a composite laminate. The decreased or "low shear values" achieved by aspects of the present disclosure are in strong contrast to typical shear values of starting (untreated/unpowdered) prepreg materials. Thus, aspects of the methods disclosed herein achieve a significant prepreg surface shear reduction that facilitates a predetermined increased degree of slippage of individual adjacently-oriented prepreg plies relative to one another during composite formation, and that results in a significant reduction and/or elimination of wrinkle formation in the prepreg ply assemblies and the finished composite materials after composite tooling and formation.

It is understood that the tack and shear values set forth herein relate to and are based upon the particular methods used to measure tack and shear. Methods for measuring tack and shear continue to develop. In addition, tack is described and methods for measuring tack are reported in journal articles including "Time-temperature Equivalence in the Tack and Dynamic Stiffness of Polymer Prepreg and its Application to Automated Composites Manufacturing", R. J. Crossley, P. J Schubel, D. S. A. De Focatiis, Composites, Part A 52 (2013), pp. 126-133; "The Experimental Characteristics of Prepreg Tack", R. J Crossley, P. J. Schubel, N. A. Warrior, University of Nottingham (2013); "Characteristics of Prepreg Tack on Different Surfaces to Aid Automated Material Placement", Andreas Endruweit, Davide S. A. De Focatiis, Sayata Ghose, Brice A. Johnson, Douglas R. Younkin, Nicholas A. Warrior, 20th Int'l. Conf. on Composite Materials (Jul. 19-24, 2015)".

According to further aspects, the resin-containing material in the prepreg, and the resin-containing material in the powdered resin-containing material may be the same material or may be different materials. However, if the materials are different, it is contemplated that the powdered material and the resin-containing material in the prepreg ply will be compatible when pressure and/or heat are applied (e.g. during prepreg assembly and curing) to a stack of resin-containing prepreg plies treated with the powdered resin-containing material. In this regard, non-resin-containing particulate materials include materials that exhibit compatibility with resin-containing materials, for example, talc, silica (commercially available as "Cab-o-Sil™"), etc. Talc is understood to be a clay mineral composed of hydrated magnesium silicate with the chemical formula $H_2Mg_3(SiO_3)_4$ or $Mg_3Si_4O_{10}(OH)_2$ and may be refined to achieve a useful and desired particle size (e.g. average diameter) of up to about 10 microns, or more. Cab-o-Sil™ is commonly used as a thickening agent for fluids, and is a synthetic, amorphous, untreated fumed silicon dioxide, and is considered to be inert, with an extremely fine average particle size (e.g. average diameter) ranging from about 0.2 to about 0.3 microns.

According to still further aspects, the predetermined amount of powdered material applied to or dispensed to predetermined portions of predetermined locations or regions on at least one surface of the prepreg ply is contemplated to be an amount that will not interfere in the fabricating process of the composite material. In other words, the predetermined amount of powdered resin presented to at least one surface of the prepreg ply will essentially and substantially be absorbed into the prepreg ply during the processing of the composite being fabricated from the prepreg plies, or otherwise will not interfere with prepreg ply assembly and composite material formation. In this way, the quality and integrity of the resulting composite component sustains no appreciable change in its characteristics and/or performance in the end use of the composite component due to the addition of the powdered material during prepreg ply assembly.

Many high performance thermosetting resins, such as epoxies, can be formulated as B-stage systems. A B-stage system is a system wherein the reaction between the resin and the curing agent/hardener is not complete. As a result, the system is in a partially cured stage. When this system is then reheated at elevated temperatures and/or subjected to pressure, the cross-linking is completed and the system fully cures.

In the field of composite manufacturing, there are many advantages to using a thermosetting B-stage system. The need for measuring and mixing is eliminated since this is a one part system. In many cases, thermosetting B-stage systems help to increase the performance of the product and decrease the overall manufacturing/production cost. Also, thermosetting B-stage systems can be more convenient to use in many applications as compared with a two part systems. Thermosetting B-stage systems are understood herein to comprise epoxy-resin thermosetting B-stage systems. While the present application refers to epoxy-resin systems, it is understood that aspects of the present application can be extended to B-stage systems beyond those specifically incorporating epoxy resins.

Aspects of the present disclosure are directed to the use of B-stage epoxies as the epoxy used in both the prepreg plies and in the powdered or particulate material. Contemplated epoxy resin-containing materials include, without limitation, digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, etc., or combinations thereof. At least one curative compound is contemplated as being present, including, without limitation, 4,4"-diamino diphenyl sulfone; 3,3"-diamino diphenyl sulfone; diethyl toluene dianiline, etc.

According to aspects of the disclosure, materials to be used as the particulate material, or powdered material include, without limitation, B-stage epoxies, that may be cryomilled into a powdered state. Cryomilling refers to the process by which a material, such as an epoxy, is exposed to liquid nitrogen or other suitable coolant in an inert atmosphere, followed by precision grinding to a predetermined average particle size, or average particle size ranges. Contemplated average particle sizes (diameters) of the particulate material (e.g. powdered epoxy) according to aspects of the present disclosure range from about 0.1 to about 100 microns, more preferably, from about 0.2 to about 30 microns and still more preferably from about 0.2 to about 10 microns. The precise particle sizes and geometric dimensions of the particulate material (e.g. powdered epoxy resin-containing material) are limited only by the ability of the particulate material to be absorbed into the prepreg resin material. In addition, whether or not the particulate material is absorbed into the prepreg ply, the average particle size (e.g. average particle size range) of the particulate material, as well as the amount of particulate material applied to a surface or surfaces of a prepreg ply, is selected to not interfere with desired resulting characteristics of the uncured prepreg ply assembly, the cured prepreg ply assembly and/or the finished composite material made therefrom.

According to aspects of the present disclosure, the contemplated epoxy resins suitable for use as the particulate material are epoxy resin-containing materials tailored for cryogenic grinding. According to one contemplated cryomilling process, a grinding jar is continually cooled with liquid nitrogen from an integrated cooling system before and during the grinding process. Thus, the sample is embrittled, and volatile components are preserved. The liquid nitrogen circulates through the system and is continually replenished from an autofill system in an amount required to maintain the temperature at approximately −196° C. Powerful impact ball milling results in a desired grinding efficiency. The autofill system avoids direct contact with the liquid nitrogen, and makes cryogenic grinding desirable from a safety standpoint. One such device is sold commercially as the Cryo-Mill, (Retsch, Haan, Germany) and can conduct cryogenic, wet, and dry grinding at room temperature.

Aspects of the present disclosure further contemplate that the particulate material (e.g. powdered resin-containing material) may be applied in predetermined amounts by any appropriate method to predetermined locations or predetermined regions on at least one surface (e.g. the front surface or back surface) of the prepreg plies. Such methods include, but are not limited to, manual or automated apparatuses to include, but which are in no way limited to, spray guns, nozzles, etc. Further, the prepreg plies may be directed to a chamber where predetermined amounts of particulate material are released into the chamber atmosphere, with the prepreg plies having a resident time within the chamber necessary to achieve a desired and predetermined degree of particulate material deposition onto predetermined areas of prepreg ply front and/or prepreg ply back surfaces. According to any deposition method selected, a predetermined amount of particulate material, for example, a powdered resin-containing material, is delivered to a predetermined portion, or to predetermined locations or regions on at least one surface of a predetermined number of prepreg plies.

According to one contemplated aspect, a powdered epoxy resin-containing material is applied to a surface, or predetermined region or location of a predetermined number of prepreg plies using an electrostatic spray gun. Electrostatic guns electrically charge the powdered resin material using compressed air and voltage. According to a contemplated aspect, the powdered resin material is held in a hopper and fluidized. Once the trigger is activated on the spray gun, the powdered resin material is drawn into and out of the gun using compressed air. In addition, a voltage source creates an electrostatic field at the tip of the gun which imparts the powder with a charge, such as, a positive charge. As a result, the powdered resin material adheres to the grounded part. According to the present disclosure, the term "particulate resin-containing material" includes particulate resin materials.

According to a further aspect, a predetermined area, and/or predetermined locations, regions, etc. on at least one surface (e.g. front and/or back surface) of the prepreg ply surface may be masked with a masking material (otherwise referred to equivalently as a "maskant") to assist in delivering a predetermined amount of particulate material to predetermined areas and/or predetermined locations, regions, etc. on at least one prepreg ply surface. The maskant may be brought into intimate contact with a surface of a prepreg ply such as in the form of a film or coating that may or may not be removable. Alternately, a template or stencil may act as a maskant that may be either affixed to the apparatus used to dispense the particulate material, or that may be located at a predetermined position that is located between the dispensing apparatus and the prepreg ply surface at a predetermined distance from or proximate to the prepreg ply surface. Therefore, any device that impacts the predetermined amount of particulate material that is to be deposited to a predetermined location on a prepreg ply surface is contemplated by aspects of the present disclosure. Further, the geometry of the maskant used (whether of an applied film type or template or stencil type, etc.) may be substantially consistent for each prepreg ply in a prepreg ply assembly, or stack. Still further, the geometry of the maskant used (whether of an applied film type or template or stencil type, etc.) may vary among the prepreg plies in a prepreg ply assembly, or stack as desired, depending only on the predetermined degree desired of spatially varying slippage, interlaminar shear and/or tack that a given ply in a stack will need to respond appropriately during prepreg assembly and composite formation.

Further aspects of the disclosure contemplate not only directing a predetermined amount of particulate material to a predetermined region or regions of prepreg plies that may be substantially consistent for each prepreg ply in a prepreg ply assembly, or stack, but also varying the amount of particulate material and/or varying the location of the predetermined region on the surface of each prepreg ply that is to receive a predetermined amount of particulate material. In this way, aspects of the present disclosure contemplate the ability to tailor the quantity and the location of the deposited particulate material (e.g. powdered resin-containing material) for each prepreg ply, depending, for example, on the desired slippage to be achieved as well as various desired prepreg assembly processing factors, and the desired resulting composite component configuration. Such factors include, but are in no way limited to prepreg ply geometry, location of the ply within the prepreg assembly stack, final composite part geometry, etc.

According to an aspect of the disclosure, FIG. 1 shows a prepreg ply directed through a prepreg ply treatment process 10 to spatially vary the slippage, shear, and/or tack of at least one prepreg ply surface. More specifically, FIG. 1 shows treatment of a (e.g. front) surface of a prepreg ply 11. The prepreg material used to fabricate the starting prepreg ply 11 is understood to comprise a fiber component and a resin component. At processing stage 10a, the prepreg ply 11 is oriented and directed to processing stage 10b, where the front surface 12 of prepreg 11 has a predetermined portion of its front surface 12 masked with a masking film 13, leaving a predetermined portion 12a of the front surface 12a of the prepreg ply 11 exposed. The now partially masked prepreg ply 11 then proceeds to a station 10c in the process where a particulate material (e.g. a powdered resin) 14 is dispensed from a powdered resin dispensing head 15 to the front surface 12. A predetermined amount of powdered resin 14 is dispensed to at least the front surface 12 of the prepreg ply 11, with a predetermined amount of particulate material 14, adhering to the exposed predetermined portion 12a of front surface 12 of prepreg ply 11. Processing stage 10d shows the masking film 13 now removed from the front surface 12 of the treated prepreg ply 11, with predetermined portions 12a of the front surface 12 of the prepreg ply 11 now comprising a predetermined amount of particulate material 14, and the remaining untreated portion 12b of the front surface 12.

FIG. 2 shows an exploded view of a composite forming process 20 wherein a plurality of prepreg plies 11 prepared according to a process as illustrated in FIG. 1 are oriented in a stacked configuration over a forming tool 22, with the forming tool having a non-planar surface 24 onto which the prepreg plies 11 are placed. Prepreg plies 11 each show a front surface 12, having predetermined portions 12a comprising a coating of a predetermined amount of particulate material 14. A prepreg ply 26 that is not treated on its front surface 27 is shown as a top layer or ply on the prepreg stack. However, if desired, the top prepreg ply layer may also comprise a predetermined amount of particulate material at predetermined locations on the front surface of the top prepreg ply 26. While treated front surfaces of the prepreg plies comprising the particulate material are shown in FIGS. 1 and 2, treatment of back prepreg ply surfaces only, front prepreg ply surfaces only, or treatment combinations of prepreg ply front and back surfaces are contemplated by aspects of the present disclosure. In addition, depending on the end use of the composite, it may be desirable for the front surface, or "top" surface of the top prepreg ply to remain untreated. It is contemplated that the layer of applied particulate material will be absorbed into the prepreg resin during the layup and processing of the prepreg stack, or will otherwise not adversely impact the desired characteristics of the prepreg assembly and the composite material made therefrom.

According to further contemplated aspects of the present disclosure, FIGS. 3A and 3B show schematic drawings of a composite fabricating process comprising a plurality of prepreg plies 36 treated according to aspects of the present disclosure. FIG. 3A shows an apparatus for forming composite materials. Vacuum chamber 30 comprises a base 32 and a flexible shroud 34 attached to base 32. A stack or assembly comprising a plurality of prepreg plies 36 to be oriented onto a surface 37 of forming tool 38 are shown suspended just above and proximate to a tool surface 37 of forming tool 38, although it is understood that FIG. 3A is for illustration purposes only, and that the prepreg plies may be individually and sequentially built up upon the forming tool. Once the prepreg ply assembly 36 is oriented onto surface 37 of forming tool 38, a negative pressure is applied to the chamber 30, via a vacuum source (not shown) to remove air from the chamber and to provide a predetermined amount of downward and inward pressure as illustrated by the arrows. A predetermined amount of pressure at a predetermined temperature is provided for a predetermined amount of time to fabricate a formed composite material in the chamber 30. A schematic illustration of a representative formed composite material is shown in FIG. 3B. In FIG. 3B, the flexible shroud 34 has been brought into intimate contact with the forming tool 38 and the prepreg ply assembly 36 shown in FIG. 3A, via the negative pressure induced by a vacuum source (not shown) to shape the prepreg ply assembly 36 over the forming tool 38, such that the prepreg ply assembly 36 is formed into a composite material 39. In this way, the composite material 39 takes on the shape of the surface 37 of the forming tool 38. The present disclosure further contemplates that the forming of the prepreg ply assembly may be conducted mechanically (e.g. without the presence of a vacuum) or by contemplated combinations of mechanical and vacuum forming processes, or other known processes for forming a laminate on a forming mandrel.

According to aspects of the present disclosure, predetermined portions of the surfaces of the plies are treated with particulate material (e.g. powdered resin-containing material) to facilitate a predetermined degree of slippage and minimize or substantially eliminate wrinkle formation in the plies of a prepreg ply assembly during layup and composite processing into a composite part. It is therefore contemplated that the surface of a prepreg ply in the stack 36 that will come into contact with the tool surface 37 (e.g. a "bottom" prepreg ply surface) may or may not have a predetermined portion of the bottom surface treated with a particulate material to facilitate a predetermined degree of slippage and minimize or eliminate wrinkle formation in the plies during layup and composite processing. In addition, further aspects contemplate providing a tool surface 37 comprising a material that inherently facilitates a predetermined degree of slippage and minimize or substantially eliminate wrinkle formation in the plies during layup and composite processing, or the tool surface may also receive a predetermined amount of particulate material delivered to predetermined portions of the tool surface 37 to facilitate a predetermined degree of slippage and minimize or substantially eliminate wrinkle formation in the plies during layup and composite processing.

FIG. 4A is a flowchart outlining an aspect of the present disclosure. According to FIG. 4A, a method 40A is outlined for fabricating a prepreg ply comprising 42 orienting a prepreg ply comprising a prepreg ply front surface and a prepreg ply back surface; 44 applying a predetermined amount of a particulate material to a predetermined location of at least one of the prepreg ply front surface and prepreg ply back surface; and 46 by a predetermined amount varying slippage of at least one of the prepreg ply front surface and prepreg ply back surface plies.

FIG. 4B is a flowchart outlining an aspect of the present disclosure. According to FIG. 4B, a method 40B is outlined for fabricating a prepreg ply comprising 42 orienting a prepreg ply comprising a prepreg ply front surface and a prepreg ply back surface; 43 applying a maskant to at least one of the prepreg ply front surface and the prepreg ply back surface; 44 applying a predetermined amount of a particulate material to a predetermined location of at least one of the prepreg ply front surface and prepreg ply back surface; 46 by a predetermined amount varying slippage of at least one of the prepreg ply front surface and prepreg ply back surface plies; and 47 removing the applied maskant from the prepreg ply.

FIG. 5A is a flowchart outlining a further aspect of the present disclosure. FIG. 5A outlines a method 50A for fabricating a prepreg ply assembly comprising: 52 orienting a plurality of prepreg plies, with the prepreg plies comprising a prepreg ply front surface and a prepreg ply back surface; 53 applying an amount particulate material to a predetermined location of at least one of the prepreg ply front surface and a prepreg ply back surface of at least one of the plurality of prepreg plies; 46 by a predetermined amount varying slippage of at least one of the prepreg ply front surface and prepreg ply back surface plies; and 54 orienting the plurality of the prepreg plies into a prepreg ply assembly.

FIG. 5B a flowchart outlining a further aspect of the present disclosure. FIG. 5A outlines a method 50B for fabricating a prepreg ply assembly comprising: 52 orienting a plurality of prepreg plies, with the prepreg plies comprising a prepreg ply front surface and a prepreg ply back surface; 53 applying an amount particulate material to a predetermined location of at least one of the prepreg ply front surface and a prepreg ply back surface of at least one of the plurality of prepreg plies; 46 by a predetermined amount varying slippage of at least one of the prepreg ply front surface and prepreg ply back surface plies; 54 orienting the plurality of the prepreg plies into a prepreg ply assembly; 56 orienting a plurality of prepreg plies onto a tool; and 58 inhibiting wrinkle formation in prepreg ply assembly.

FIG. 6A is a flowchart outlining a further aspect of the present disclosure. FIG. 6 outlines a method 60A comprising: 52 orienting a plurality of prepreg plies, with the prepreg plies comprising a prepreg ply front surface and a prepreg ply back surface; orienting a plurality of individual prepreg plies, with each ply having front surface tack values and back surface tack values; 53 applying an amount particulate material to a predetermined location of at least one of a prepreg ply front surface and a prepreg ply back surface of at least one of the plurality of prepreg plies; 46 by a predetermined amount varying slippage of at least one of the prepreg ply front surface and prepreg ply back surface plies; and 62 spatially varying tack of at least one of prepreg ply front surface and prepreg ply back surface.

FIG. 6B is a flowchart outlining a further aspect of the present disclosure. FIG. 6B outlines a method 60B comprising: 52 orienting a plurality of prepreg plies, with the prepreg plies comprising a prepreg ply front surface and a prepreg ply back surface; orienting a plurality of individual prepreg plies, with each ply having front surface tack values and back surface tack values; 53 applying an amount particulate material to a predetermined location of at least one a prepreg ply front surface and a prepreg ply back surface of at least one of the plurality of prepreg plies; 46 by a predetermined amount varying slippage of at least one of the prepreg ply front surface and prepreg ply back surface plies; and 64 spatially varying shear of at least one of prepreg ply front surface and prepreg ply back surface.

FIG. 7A is a flowchart outlining a further aspect of the present disclosure. FIG. 6 outlines a method 70A comprising: 52 orienting a plurality of prepreg plies, with the prepreg plies comprising a prepreg ply front surface and a prepreg ply back surface; orienting a plurality of individual prepreg plies, with each ply having front surface tack values and back surface tack values; 53 applying an amount particulate material to a predetermined location of at least one a prepreg ply front surface and a prepreg ply back surface of at least one of the plurality of prepreg plies; 46 by a predetermined amount varying slippage of at least one of the prepreg ply front surface and prepreg ply back surface plies; 62 spatially varying tack of at least one of prepreg ply front surface and prepreg ply back surface; 72 orienting a plurality of prepreg plies onto a tool; and 74 substantially inhibiting wrinkle formation in a prepreg ply assembly.

FIG. 7B is a flowchart outlining a further aspect of the present disclosure comprising: 52 orienting a plurality of prepreg plies, with the prepreg plies comprising a prepreg ply front surface and a prepreg ply back surface; orienting a plurality of individual prepreg plies, with each ply having front surface tack values and back surface tack values; 53 applying an amount particulate material to a predetermined location of at least one a prepreg ply front surface and a prepreg ply back surface of at least one of the plurality of prepreg plies; 46 by a predetermined amount varying slippage of at least one of the prepreg ply front surface and prepreg ply back surface plies; 64 spatially varying shear of at least one of prepreg ply front surface and prepreg ply back surface; 72 orienting a plurality of prepreg plies into a tool; and 74 substantially inhibiting wrinkle formation in a prepreg ply assembly.

FIG. 7C is a flowchart outlining a further aspect of the present disclosure comprising: 52 orienting a plurality of prepreg plies, with the prepreg plies comprising a prepreg ply front surface and a prepreg ply back surface; orienting a plurality of individual prepreg plies, with each ply having front surface tack values and back surface tack values; 53 applying an amount particulate material to a predetermined location of at least one a prepreg ply front surface and a prepreg ply back surface of at least one of the plurality of prepreg plies; 46 by a predetermined amount varying slippage of at least one of the prepreg ply front surface and prepreg ply back surface plies; 64 spatially varying shear of at least one of prepreg ply front surface and prepreg ply back surface; 72 orienting a plurality of prepreg plies into a tool; 73 forming the prepreg ply assembly onto tool; 74 substantially inhibiting wrinkle formation in a prepreg ply assembly. and 74a curing the prepreg ply assembly.

FIG. 8 is an illustration of an aircraft 80 with a circled section of fuselage 82 shown. FIG. 9 shows an interior view of fuselage section 82, showing ribs 92, stringers 94 and skins 96 made from composite components that are processed according to aspects of the present disclosure. Although not shown, many additional aircraft parts and components can comprise the improved composite laminates made according to aspects of this disclosure including, for example, wing structures including, for example, spars, etc.

While the methods, systems and apparatuses disclosed herein find utility in connection with composite/laminate formation processes and the composite/laminate parts made therefrom, aspects of the present disclosure further contemplate improving any composite/laminate processes (and improving the quality of the composite/laminate-containing components made therefrom) where it would be beneficial to introduce a predetermined amount of slippage among the prepreg plies during formation of composite components, wherein such predetermined slippage ameliorates, minimizes, reduces or substantially or completely eliminates wrinkle formation in the resulting cured and uncured components made from the prepreg plies.

According to the present disclosure, the term "slippage" refers to the relative movement (including, but not limited to translational movement) of adjacent prepreg plies relative to one another from a first orientation as they are laid up, to the relative orientation of the adjacent plies during composite formation. Such composite formation includes, but is not limited to, the composite formation that occurs during drape-forming processes, including the drape-forming processes described above, as well as processes including, but not limited to, processes for forming composite cloth, for example, over complex honeycomb assemblies, bonding wet epoxy prepregs to metallic structures, and other composite forming processes, etc.

According to some aspects of the present disclosure, the predetermined degree or amount of allowed or induced slippage that is contemplated by aspects of the present disclosure is quantified as ranging from about 0.1 inch to about 3.5 inches of displacement from a starting position depending, for example, on the desired geometry of the final composite part. For the purposes of the present disclosure the term "slippage" is understood to refer to any predetermined amount or degree of movement of prepreg plies relative to one another during any phase of prepreg assembly, forming, and/or curing.

Aspects of the present disclosure therefore contemplate that, as shear and tack of the prepreg plies across their (one or more) surfaces, or across predetermined portions of their surfaces is varied spatially and therefore reduced relative to the shear and tack values of an untreated prepreg ply surface, a predetermined amount of slippage of the plies relative to one another is allowed to occur or induced. In this way, aspects of the present disclosure contemplate a predetermined amount of freedom of movement of adjacent prepreg plies during composite formation, such as those including, but not limited to, drape-forming composite processes, etc. Such predetermined allowed or induced relative movement through a reduction of shear or tack and a predetermined increase in slippage substantially eliminates, or ameliorates wrinkle formation in the prepreg plies. In other words, the initial inner ply lamina alignment during layup is intentionally induced or allowed to move, or "slip" to a predetermined amount or degree during composite part formation (for example, the formational bending of assembled lamina prepreg plies that occurs around a tooling form) by reducing localized prepreg ply surface tack values of at least one surface of the plies themselves, and thereby reducing "out of plane" distortion as the interlaminar shear between adjacently positioned prepreg plies increases.

For the purposes of this disclosure, the term "spatially variable shear and/or tack value" also refers to the condition realized across at least one surface of a prepreg ply wherein shear and/or tack values vary in a predetermined fashion across at least one prepreg ply surface that has been treated with a particulate according to aspects of the present disclosure. When a surface of a prepreg ply has been treated according to aspects of the present disclosure, the shear and/or tack values across the treated surface will vary spatially in a predetermined way at predetermined locations on the treated surface of the prepreg ply.

The ability to reduce or substantially eliminate wrinkle formation improves composite component quality, integrity, etc., and reduces the amount of waste or scrap material that otherwise occurs in the course of composite component production. The term "substantially eliminate" relative to wrinkle formation refers to the nearly complete elimination of wrinkle formation in finished composite parts, and contemplates the reduction of wrinkles to the point where wrinkles are not perceptible to inspection techniques that are commonly used to inspect finished composite components and parts. Therefore, "substantial" elimination of wrinkle formation is understood to mean the significant reduction and nearly complete elimination of wrinkle formation as compared to the wrinkle formation that can occur without the treatment of the plies that allow for a predetermined amount of slippage as set forth herein and as according to aspects of the present disclosure, but to a degree of wrinkle elimination that may be less than total elimination, or that may include complete elimination of all wrinkle formation.

EXAMPLES

Shear Testing

Testing was conducted to determine the effect of prepreg ply assemblies treated with powdered resin according to aspects of the present disclosure. Four (4) carbon fiber prepreg ply samples comprising epoxy resin were tested at room temperature. Two samples that were not treated were studied as reference samples. One sample comprised an amount of cryogenically ground (i.e. powdered) epoxy resin material (Cycom 970—Cytec Solvay Group). One sample comprised an amount of Cab-o-Sil™; a material commonly used as a filler in epoxy resins. Shear testing was performed at a displacement rate of 0.5 inch/min. using a Bespoke shear/tack tester and Instron load frame. The results of the testing are shown plotted in FIG. 10. FIG. 10 depicts the untreated reference prepreg ply samples (Reference Samples 1 and 2) having shear force peaks of about 250 N/m$^2$ and 350 N/m$^2$ respectively as the Reference Samples 1 and 2 are subjected to extension (mm). By contrast, the prepreg plies treated with Cab-o-Sil™ and the milled Cycom 970 powdered epoxy resin, according to aspects of the present disclosure, did not yield a shear force peak when subjected to extension (mm) during testing, but maintained a substantially reduced observed and measured shear throughout the testing protocol, and leading to a reduction of shear stress of 97%.

The testing showed the effect of the addition of particulate material placed onto a prepreg ply surface and that the addition of a predetermined amount of particulate material to predetermined locations or regions of a prepreg ply surface will reduce shear forces generated during layup and forming of prepreg assemblies. Since shear force reduction was shown though the shear force testing, the shear force testing confirms that the prepreg plies treated with powdered resin or non-resin-containing particulate materials will provide a predetermined and desired amount of slippage relative to one another when the prepreg plies are assembled into a prepreg ply assembly. The testing further confirms that prepreg plies treated according to aspects of the present disclosure possess desired and predetermined slippage characteristics (relative to one another within the prepreg assembly, or "stack") significantly different from prepreg ply assemblies that are not so treated. The increase in slippage of surfaces of particulate-treated prepreg surfaces (as demonstrated by, e.g. an observed and measured reduction in shear force) is thought to significantly ameliorate or even substantially eliminate wrinkle formation in simple planar or even complex non-planar manufacture of parts and components made from prepreg assemblies (e.g. laminates).

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects, such stationary objects including, without limitation, bridge trusses, support columns and structures, buildings, general construction objects, etc. Further structures and objects include vehicles, such as, without limitation, aircraft, satellites, rockets, missiles, etc., and therefore further include manned and unmanned aircraft, manned and unmanned spacecraft, manned and unmanned rotorcraft, manned and unmanned terrestrial vehicles, manned and unmanned non-terrestrial vehicles, manned and unmanned surface and sub-surface water-borne vehicles, objects, and structures. Particularly contemplated components include aircraft stringer, spars, ribs, as well as other planar and non-planar geometries used in the manufacture of aircraft components and parts, etc.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof. When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for fabricating a prepreg ply assembly comprising:
   orienting a plurality of prepreg plies, said plurality of prepreg plies comprising at least:
      a first prepreg ply, said first prepreg ply comprising a first prepreg ply front surface and a first prepreg ply back surface, said first prepreg ply front surface comprising a first prepreg ply front surface initial tack value, said first prepreg ply back surface comprising a first prepreg ply back surface initial tack value;
      a second prepreg ply, said second prepreg ply comprising a second prepreg ply front surface and a second prepreg ply back surface, said second prepreg ply front surface comprising a second prepreg ply front surface initial tack value, said second prepreg ply back surface comprising a second prepreg ply back surface initial tack value;
   applying an amount of a powdered particulate material to a predetermined region of at least one of the prepreg ply front surface and the prepreg ply back surface to form a treated region and an adjacent untreated region on the at least one of the prepreg ply front surface and the prepreg ply back surface of at least a predetermined number of prepreg plies, said amount of the powdered particulate material added to a predetermined region of at least one of the prepreg ply front surface and the prepreg ply back surface in an amount sufficient to lower at least one of the first prepreg initial tack value and the second prepreg ply initial tack value to a tack value ranging from about 1 $N/m^2$ to about 100 $N/m^2$;
   orienting said first prepreg ply front surface adjacent to the second prepreg ply back surface;
   orienting the plurality of the prepreg plies into a starting position into a prepreg ply assembly;
   inducing a tailored amount of predetermined slippage between the first prepreg ply and the second prepreg ply, said tailored amount of predetermined slippage quantified as ranging from about 0.1 inch to about 3.5 inches of displacement from the starting position;
   wherein interlaminar shear between said first prepreg ply front surface adjacent to the second prepreg ply back surface ranges from about 1 $N/m^2$ to about 1500 $N/m^2$; and
   wherein said powdered particulate material consists essentially of a powdered particulate material having an average particulate diameter ranging from about 0.2 to about 30 microns.

2. The method of claim 1 further comprising:
   varying slippage of the plurality of prepreg plies by spatially varying tack between treated surfaces and untreated surfaces of adjacent prepreg plies in the prepreg ply assembly.

3. The method of claim 1, further comprising:
   varying slippage of the plurality of prepreg plies by spatially varying tack across at least one of the prepreg ply front surface and the prepreg ply back surface.

4. The method of claim 1, wherein, the powdered particulate material comprises a powdered resin-containing material.

5. The method of claim 4, wherein, the powdered particulate material comprises a B-stage epoxy resin-containing material.

6. The method of claim 1, wherein, the powdered particulate material is selected from the group consisting of: diglycidyl ethers of bisphenol A; diglycidyl ethers of bisphenol F; N,N,N',N'-tetragylcidyl-4,4'-diaminophenylmethane; p-aminophenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, and combinations thereof.

7. The method of claim 1, further comprising:
   forming the prepreg ply assembly onto a tool.

8. The method of claim 7, further comprising:
   curing the prepreg ply assembly.

9. The method of claim 1, wherein said powdered particulate material comprises an average particulate diameter ranging from about 0.2 to about 10 microns.

10. The method of claim 1, wherein the particulate material comprises an inert powdered particulate material.

11. The method of claim 1, wherein the powdered particulate material further comprises an amorphous, untreated fumed silicon dioxide material, said amorphous, untreated fumed silicon dioxide material consisting essentially of an average particle diameter ranging from about 0.2 to about 0.3 micron.

12. The method of claim 1, wherein the powdered particulate material further comprises a hydrated magnesium silicate material.

13. The method of claim 1, wherein the powdered particulate material comprises a cryogenically ground epoxy resin-containing material.

14. The method of claim 1, wherein the powdered particulate material is cryogenically ground.

15. The method of claim 1, wherein at least one of the plurality of prepreg plies and the powdered particulate material comprises:
an epoxy resin-containing material selected from the group consisting of: diglycidyl ethers of bisphenol A; diglycidyl ethers of bisphenol F; N,N,N',N'-tetragylcidyl-4,4'-diaminophenylmethane; p-aminophenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, and combinations thereof.

16. A method for fabricating a prepreg ply assembly comprising:
orienting a plurality of prepreg plies, said plurality of prepreg plies comprising at least:
a first prepreg ply, said first prepreg ply comprising a first prepreg ply front surface, said first prepreg ply front surface comprising a first prepreg ply front surface initial tack value and a first prepreg ply back surface, said first prepreg ply back surface comprising a first prepreg ply back surface initial tack value;
a second prepreg ply, said second prepreg ply comprising a second prepreg ply front surface, said second prepreg ply front surface comprising a second prepreg ply front surface initial tack value and a second prepreg ply back surface, said second prepreg ply back surface comprising a second prepreg ply back surface initial tack value;
applying a masking material to at least one of the prepreg ply front surface of a predetermined number of prepreg plies, and the prepreg ply back surface of a predetermined number of prepreg plies;
applying an amount of a powdered particulate material to a predetermined region of at least one of the prepreg ply front surface and the prepreg ply back surface to form a treated region and an untreated region on the at least one of the prepreg ply front surface and the prepreg ply back surface of at least a predetermined number of prepreg plies, said amount of powdered particulate material added to a predetermined region of at least one of the prepreg ply front surface and the prepreg ply back surface in an amount sufficient to lower at least one of the front surface initial tack value and the back surface initial tack value to a tack value ranging from about 1 N/m$^2$ to about 100 N/m$^2$;
removing the masking material, from the predetermined number of prepreg plies;
orienting said first prepreg ply front surface adjacent to the second prepreg ply back surface;
orienting the plurality of the prepreg plies in a starting position into a prepreg ply assembly;
inducing a tailored amount of predetermined slippage between the first prepreg ply and the second prepreg ply, said tailored amount of predetermined slippage quantified as ranging from about 0.1 inch to about 3.5 inches of displacement from the starting position;
wherein interlaminar shear between said first prepreg ply front surface adjacent to the second prepreg ply back surface ranges from about 1 N/m$^2$ to about 1500 N/m$^2$; and
wherein said powdered particulate material consists essentially of a powdered particulate material having an average particulate diameter ranging from about 0.2 to about 30 microns.

17. The method of claim 16, wherein, the masking material is selected from the group consisting of: paper; polyethylene film, polyfluoride film, and combinations thereof.

18. The method of claim 16, wherein said powdered particulate material comprises an average particulate diameter ranging from about 0.2 to about 10 microns.

19. The method of claim 16, wherein the powdered particulate material further comprises an inert particulate material, said inert material comprising an amorphous, untreated fumed silicon dioxide material, said amorphous, untreated fumed silicon dioxide material comprising an average particle diameter ranging from about 0.2 to about 0.3 micron.

20. The method of claim 16, wherein the powdered particulate material further comprises a hydrated magnesium silicate material.

21. The method of claim 16, further comprising:
varying slippage of the plurality of prepreg plies by spatially varying tack across at least one of the prepreg ply front surface and the prepreg ply back surface.

* * * * *